United States Patent [19]

Gonzales et al.

[11] Patent Number: 4,870,695
[45] Date of Patent: Sep. 26, 1989

[54] COMPRESSION AND DE-COMPRESSION OF COLUMN-INTERLACED, ROW-INTERLACED GRAYLEVEL DIGITAL IMAGES

[75] Inventors: Cesar A. Gonzales, Mahopac; Joan L. Mitchell, Ossining; William B. Pennebaker, Jr., Carmel, all of N.Y.

[73] Assignee: International Business Machines Corporation, Armonk, N.Y.

[21] Appl. No.: 284,831

[22] Filed: Dec. 13, 1988

Related U.S. Application Data

[63] Continuation of Ser. No. 28,629, Mar. 20, 1987, abandoned.

[51] Int. Cl.[4] ............................................. G06K 9/36
[52] U.S. Cl. ...................................... 382/56; 382/41; 382/49; 358/135
[58] Field of Search ....................... 382/41, 49, 50–56; 358/133, 135, 136, 138, 260, 261; 364/723, 725

[56] References Cited

U.S. PATENT DOCUMENTS

| | | | |
|---|---|---|---|
| 3,769,451 | 10/1973 | Connor | 358/135 |
| 4,055,756 | 10/1977 | Jolivet et al. | 364/725 |
| 4,369,463 | 1/1983 | Anastassiou et al. | 358/138 |
| 4,488,174 | 12/1984 | Mitchell et al. | 358/136 |
| 4,517,596 | 5/1985 | Suzuki | 358/133 |
| 4,578,704 | 3/1986 | Gharavi | 358/135 |
| 4,661,850 | 4/1987 | Strolle et al. | 358/136 |
| 4,703,348 | 10/1987 | Yuasa et al. | 358/133 |
| 4,725,885 | 2/1988 | Gonzales et al. | 358/135 |

Primary Examiner—Leo H. Boudreau
Assistant Examiner—Jose L. Couso
Attorney, Agent, or Firm—Thomas P. Dowd

[57] ABSTRACT

In an image in which some pixels in some rows of an image have values associated therewith, apparatus and method of processing, for subsequent entropy coding or decoding, graylevel data for the remaining pixels in the image.

22 Claims, 24 Drawing Sheets

BINARY DECISION TREE

COMPRESSION AND DE-COMPRESSION OF COLUMN-INTERLACED, ROW-INTERLACED GRAYLEVEL DIGITAL IMAGES

This application is a continuation of U.S. patent application Ser. No. 07/028,629, filed Mar. 20, 1987, now abandoned.

BACKGROUND OF THE INVENTION

I. Field of the Invention

The present invention relates to the compression of graylevel data images.

II. Prior and Contemporaneous Technology

In many applications, an image is to be communicated rapidly or is to be contained in limited storage.

Typically, the image is partitioned into numerous picture elements to facilitate the processing of image data. A picture element is typically referred to as a "pixel" or "pel".

Generally, the image is defined as m lines of n pixels/line. Collectively, the lines of pixels represent the image.

Each pixel may be white or black, or may have a graylevel (or grayscale) value associated therewith. The binary or multilevel data is normally provided in digital form, which facilitates communication and storage thereof.

One way of representing the information contained in an image is to scan the pixels line-by-line and provide the value for each pixel. For example, suppose the upper left pixel is identified as $X_{1,1}$ where the first subscript corresponds to the line number and the second subscript corresponds to the pixel in the line. The second pixel in the first line is then $X_{1,2}$. If there are 480 lines and 512 pixels/line, an image for a given instant can be represented by information gathered by scanning the 480×512 pixels.

In a graylevel image, each pixel has a graylevel value assigned thereto, ranging between a black value (e.g., 0) and a white value (e.g., 255). That is, given 8 bits, the graylevel of a pixel can have any of 256 values. Proceeding line-by-line, an image can be represented by the successively recorded values of pixels $X_{1,1}, X_{1,2}, \ldots, X_{480,512}$.

Typically in the past, a top-to-bottom scan of the image has been referred to as a "field" and a plurality of fields have been interlaced to form a "frame". For example, one field may comprise the odd-numbered lines which are scanned first and a second field may comprise the even-numbered lines which are scanned thereafter. The two fields together form a single "frame".

The above straightforward approach results in a large number of bits required for each image to be recorded. The large number of bits can make the storing and/or rapid conveying of data impractical where storage space is limited or rapid data transfer is required. It is thus desirable to reduce, or compress, the number of bits required to represent the graylevel data.

To address the problem of reducing the number of required bits, a number of data compression techniques have been taught.

One technique of data compression is referred to as "entropy coding". In entropy coding, the number of bits used in representing events is intended to be inversely related to event probability. More probable events are represented by code-words characterized by a relatively short length (of bits) whereas less probable events are represented by relatively longer lengths.

To perform entropy coding, an entropy coder typically receives two inputs. The first input is a decision and the second input is a state input which provides a context for the decision input. For example, a binary decision input may represent a heads or tails event for a coin toss; or an ON or OFF condition for a switch; or a 1 or 0 value of a bit in a string. The state input—usually based on history, theory, or estimate—provides some contextual index for the decision input. For example, in an image in which a pixel may be either black or white, different neighborhoods of the image may have different likelihoods of a pixel therein being white. That is, each neighborhood has a respective estimated black-white probability ratio associated therewith. Hence, to provide meaning to the decision input, a state input is furnished to reflect the neighborhood corresponding to the decision input. Based on the state input, the entropy coder transforms the decision input into a code-word of appropriate length. The state input to the entropy coder is the result of modelling, i.e. defining the contexts in which code-words are assigned to decisions. A well-known example of modelling involves Markov states. The compression of the entropy encoder depends on the quality of the modelling—that is, how well the state input to the entropy coder represents the actual decision context, e.g. The decisional probability given the context neighborhood.

The correct assignment of code-word lengths is dictated by information theory concepts and is based on the estimated probability of occurrence of the possible decision outcomes. The better the probability estimate, the more efficient the code-word length assignment, and the better the compression.

One example of an entropy coder is described in detail in co-pending patent applications: "ARITHMETIC CODING DATA COMPRESSION/DE-COMPRESSION BY SELECTIVELY EMPLOYED, DIVERSE ARITHMETIC CODING ENCODERS AND DECODERS", invented by J. L. Mitchell and W. B. Pennebaker, U.S. Ser. No. 06/907,700; "PROBABILITY ESTIMATION BASED ON DECISION HISTORY", invented by J. L. Mitchell and W. B. Pennebaker, U.S. Ser. No. 06/907,695; and "ARITHMETIC CODING ENCODER AND DECODER SYSTEM" (Q-coder), invented by G. G. Langdon, Jr., J. L. Mitchell, W. B. Pennebaker and J. J. Rissanen, U.S. Ser. No. 06/907,714.

The invention disclosed in the above-cited co-pending patent applications were invented by the present inventors and co-workers thereof at, and are all assigned to, the IBM Corporation; said applications being incorporated herein by reference for their teachings involving entropy coding, or more specifically arithmetic coding and adaptive probability estimation.

Other entropy coders include Huffmann coding coders and Elias coding coders. Numerous publications describe such coding approaches.

Another technique used in data compression is referred to as "Differential Pulse Code Modulation" (DPCM), which is a form of "predictive coding". According to basic DPCM teachings, a predicted value based on one or more neighboring pixel values is determined for a "subject" pixel—i.e., a pixel whose informational content is currently being coded. The difference between the value for the subject pixel and the predicted value is then used as a basis for subsequent coding. Where there is high correlation between nearby pixels, using the difference value rather than the actual graylevel value can result in significant compression. Typically, a factor-of-two compression can be achieved by using predictive coding techniques to obtain reasonably good quality pictures. A patent application filed by the present inventors and also assigned to IBM Corporation, U.S. Ser. No. 946,542, filed Dec. 22, 1986, relates to an "Adaptive Graylevel Image Compression System" in which the DPCM prediction error is quantized and entropy encoded. The apparatus and method set forth therein may be used in coding values for all pixels in an image. Alternatively, however, the method may be applied to coding just pixels where alternate rows and alternate columns intersect. Such pixels may represent a first pattern which is interlaced with another pattern to form the complete image. A pixel X in the first pattern has a pixel A to the left thereof (in said first pattern); a pixel B to the upper left diagonal (in said first pattern); a pixel C adjacent and above (in said first pattern); and pixel D to the upper right diagonal (in said first pattern). From data derived from pixels A,B,C, and D, data for pixel X is determined. By processing successive pixels in a line, one-line-after-another in the first pattern, all pixels in the first pattern are coded. In U.S. Pat. No. 4,488,174, an approach is proposed in which one field of alternate lines of an image (frame) is encoded from data derived during the prior encoding of pixels in the other field. That is, the algorithm encodes pixels in the "missing" rows.

The encoding of pixels in the missing rows and missing columns—which result from processing pixels in the first pattern discussed hereinabove—is not disclosed by any known prior or contemporaneous technology.

SUMMARY OF THE INVENTION

The present invention involves apparatus and method for coding and decoding data relating to the pixels not contained in the first pattern (as described hereinabove).

Moreover, the present invention extends to the coding and decoding of pixels not contained in a first pattern of previously coded pixels, wherein the first pattern includes, generally, some pixels in some rows. For example, rather than alternate pixels in alternate rows, the first pattern may include every fourth pixel in every eighth row.

That is, in an image in which some pixels in some rows—e.g., pixels at the intersections of alternate rows and alternate columns—have previously defined graylevel values associated therewith, the present invention provides apparatus and method for efficiently encoding the values of the remaining (uncoded) pixels. More particularly, the invention features a two-stage algorithm: the first stage being used to encode quantized prediction errors for pixels in rows which include previously encoded first pattern pixel values; and the second stage being used to encode prediction error values in rows having no first pattern pixels therein.

In accordance with the invention, data compression is achieved—at least in part—by employing an entropy encoder. A quantized prediction error for each pixel represents the decision input to the entropy encoder. The state input, which defines a context for the quantized value, is generated according to a model. The first stage and the second stage each include respective models for generating state inputs for the pixels processed thereby.

For each pixel to be encoded thereby, the first stage generates a state input based on (a) a horizontal gradient (magnitude) value GRAD1 and (b) a sign value derived from the quantized value of a previously encoded pixel in a row processed earlier in the first stage. For each pixel encoded thereby, the second stage generates a state input based on (a) a vertical gradient (magnitude) value GRAD2 and (b) a sign value derived from preferably the quantized value of the left adjacent pixel The second stage uses (re-constructed) graylevel values generated during the first stage as well as pixels from the first pattern.

For a preferred embodiment in which the first pattern of pixels form a quarter resolution image by including alternate pixels in alternate rows, first pattern pixels have graylevel values corresponding therewith. The graylevel values may be the original values or may be the result of a re-construction process. The first stage of the present algorithm generates—by simple linear interpolation—prediction error values for the "missing" pixels in the half resolution rows. The prediction error, or difference, values are quantized and compressed using entropy coding techniques. By adding the quantized difference value for each "missing" pixel with the predicted value thereof, the first stage produces a re-constructed graylevel value for each "missing" pixel in a row containing first pattern pixels. After re-constructing "missing" pixel values, the image has full resolution in alternate rows and has half-resolution in the vertical direction (every other row is "missing"). In the second stage, data for the missing rows is generated and compressed using entropy coding techniques. The prediction and compression stages used in bringing the original half-resolution image into a full resolution image are symmetrical in the horizontal and vertical directions.

Where pixels at the intersections of alternate rows and alternate columns of an image have been previously coded, the present invention provides apparatus and algorithm for coding and decoding graylevel-related data for the remaining pixels in the image.

Similarly, where other arrangements of pixels form the first pattern, the coding and generating of re-constructed values for the remaining pixels is provided.

In particular, the present invention features a unique apparatus and method of coding and re-constructing values for previously uncoded (missing) pixels which are in rows that contain previously coded pixels in a first pattern, wherein the coding involves generating state inputs for entropy coding. Also, the present invention features a unique apparatus and method of coding values in rows that contain no previously coded first pattern, wherein the coding involves generating state inputs for entropy coding.

As suggested hereinabove, the present invention achieves the object of supplying decision input and state (i.e., decision context) input to an entropy encoder (and decoder) to enable data compression (and decompression).

The invention is also directed to data compression and decompression which features entropy encoding and decoding wherein the encoder and decoder each receive state inputs determined according to the two-stage algorithm previously described. In this regard, the algorithm for decompressing compressed data is essentially the same as the algorithm for compressing data, except that the compressor employs a quantizer before entropy encoding and the decompressor employs a corresponding inverse quantizer after entropy decoding.

Accordingly, for a graylevel image formed of (i) a first matrix pattern which includes all pixels at the intersections of alternating rows and alternating columns of pixels in the image and (ii) a second matrix pattern which includes the remaining pixels, wherein each pixel in the first pattern has a value which has been previously coded, a preferred compressor for image data in the second pattern comprises: (a) means for entropy encoding a digital decision input based on a state input which defines a context for the digital decision input; (b) first means for predicting a value $I1'$ for a previously uncoded pixel i1 in a row containing first pattern pixels, wherein $I1'=(L1+R1)/2$ where L1 and R1 are values for previously coded pixels which are, respectively, to the left and right of pixel i1; (c) first subtractor means for computing a difference value between the input value X1 for pixel i1 and the predicted value $I1'$ for pixel i1; (d) first means for quantizing the difference value, the quantized value corresponding to a decision input to said entropy encoder means; (e) first means for generating a sign history value for pixel i1 as the arithmetic sign of the quantized difference value previously determined for the pixel vertically above and one pixel away from pixel i1; (f) first means for generating a horizontal gradient value for pixel i1 based on the difference between values of a pixel to the left and a pixel to the right of pixel i1; (g) first means for combining the horizontal gradient value and the sign history value to provide a state input to said entropy encoding means for pixel i1; and (h) second means for predicting a value $I2'$ for a previously uncoded pixel i2 in a row containing no first pattern pixels, wherein $I2'=(A2+B2)/2$ where A2 and B2 are previously coded pixels which are, respectively, vertically above and below pixel i2; (j) second subtractor means for computing a difference value between the input value X2 of pixel i2 and the predicted value $I2'$ of pixel i2; (k) second means for quantizing the difference value, the quantized value corresponding to a decision input to said entropy encoder means; (l) second means for generating a sign history value for pixel i2 as arithmetic sign of the quantized difference value previously determined for the pixel coded immediately before and in the row containing pixel i2; (m) second means for generating a vertical gradient value for pixel i2 based on the difference between values of a pixel vertically above and below pixel i2; and (n) second means for combining the vertical gradient value and the sign history value to provide a state input to said entropy encoding means for pixel i2. A preferred corresponding decompressor includes: (a) entropy decoder means for generating output decisions which correspond to the digital decision inputs to the encoding means; and (b) decoder model means for generating state inputs as successive decisions are decoded by said entropy decoding means; said entropy decoder means generating output decisions in response to the inputting thereto of (i) compressed data generated by the entropy encoding means and (ii) state inputs from the decoder model means.

The present invention also features a two-dimensional sampling pattern of an image.

The invention achieves the above objects while maintaining high compression rate with good image quality.

BRIEF DESCRIPTION OF THE DRAWINGS

FIG. 1 is a diagram showing, for a preferred embodiment, (i) pixels in a first pattern which have been previously coded; (ii) a pixel i1 being processed in the first stage of the algorithm of the present invention; and (iii) pixels that are to be processed in the second stage of the algorithm of the present invention.

FIG. 2 is a diagram showing pixels involved in coding a pixel i2 during the second stage of the algorithm for the preferred embodiment.

DESCRIPTION OF THE INVENTION

1. Specific Implementation of a Preferred Embodiment

Figures 1, 2:
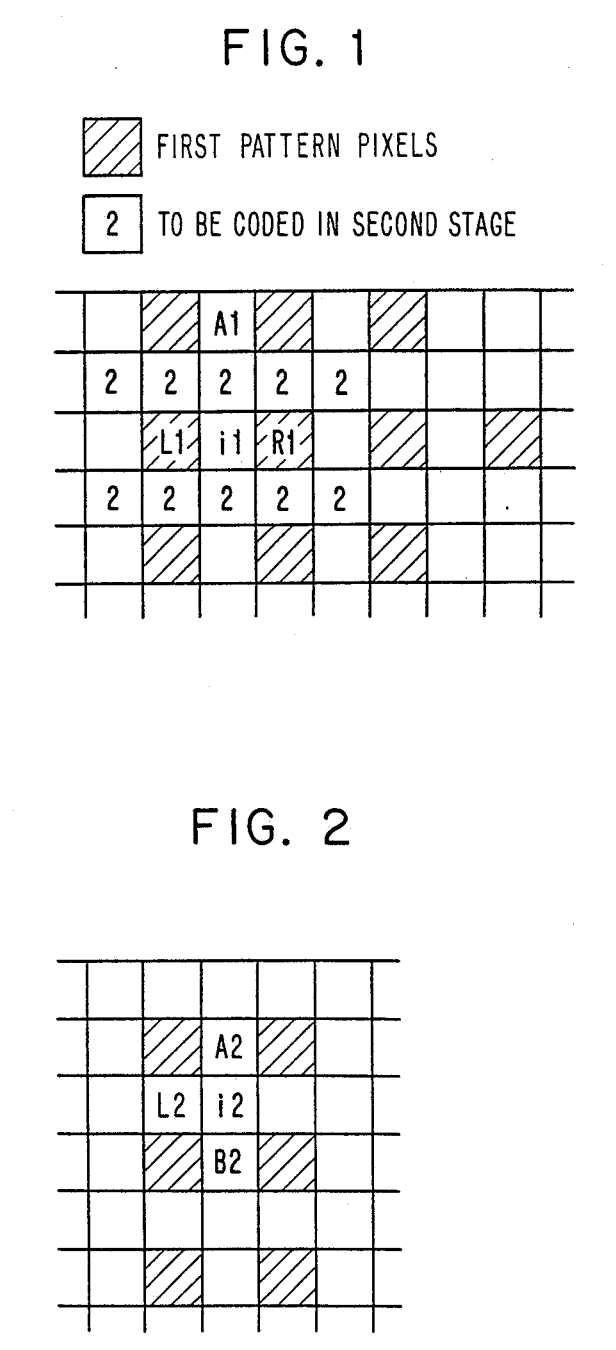

Referring to FIG. 1, a plurality of pixels in an image are shown. Typically, an image includes a frame of 480 lines with 512 pixels/line with each pixel having an 8-bit graylevel value. The present invention is directed to reducing the number of bits required to represent the graylevel values of the pixels in the image.

In FIG. 1, a number of pixels are shown with a hatched representation. These pixels (with hatched representation) are located at intersections of alternate rows and alternate columns of pixels. Together these pixels form a first pattern of pixels which portray the image with half-resolution both vertically and horizontally. Each pixel in the first pattern has been previously encoded and a re-constructed value therefor has been determined.

The present invention is directed to coding the remaining pixels (which do not have hatched representation). Pixel i1 is a sample subject pixel which is to be processed in the first stage of the algorithm of the present invention. The pixel to the left of pixel i1—which has a value L1—and the pixel to the right of pixel i1—which has a value R1—are first pattern pixels and have been previously coded, and a re-constructed value for each has been previously determined.

The previous processing of the pixels in the first pattern may have been performed according to the teachings of the aforementioned co-pending patent application or according to teachings set forth in an article entitled: "Conditional Variable Length Coding for Graylevel Pictures," by Gharavi, *AT&T Bell Labs Technical Journal*, 63, pp. 249–260, 1984.

Still referring to FIG. 1, a pixel A1 is shown vertically above pixel i1 one pixel away. The row immediately above and immediately below the pixel i1 include pixels (marked with a "2") which are to be processed during the second stage of the algorithm.

In FIG. 2, a pixel i2 is shown as a sample pixel which is processed during the second stage of the present algorithm. Pixel i2 is in a row of pixels, none of which have hatched representation. To the left of pixel i2 is pixel with value L2; directly above is a pixel with value A2; and directly below is a pixel with value B2. Pixels with respective values A2 and B2 are processed during the first stage of the algorithm (prior to the second stage). It is observed that pixel of value L2 has been processed in the second stage just before processing of pixel i2 commences. (The pixels involved in the earlier processing of pixel with value L2 may be envisioned by sliding each of the four pixels i2, L2, A2, and B2 one pixel position to the left—A2 and B2 in such case representing pixels processed in the first pattern.) It is noted that the same variable, e.g. L1, L2, R1, A1, and B2 may represent the pixel or the value of the pixel. The meaning of the variable will be clear from context.

Figure 3:
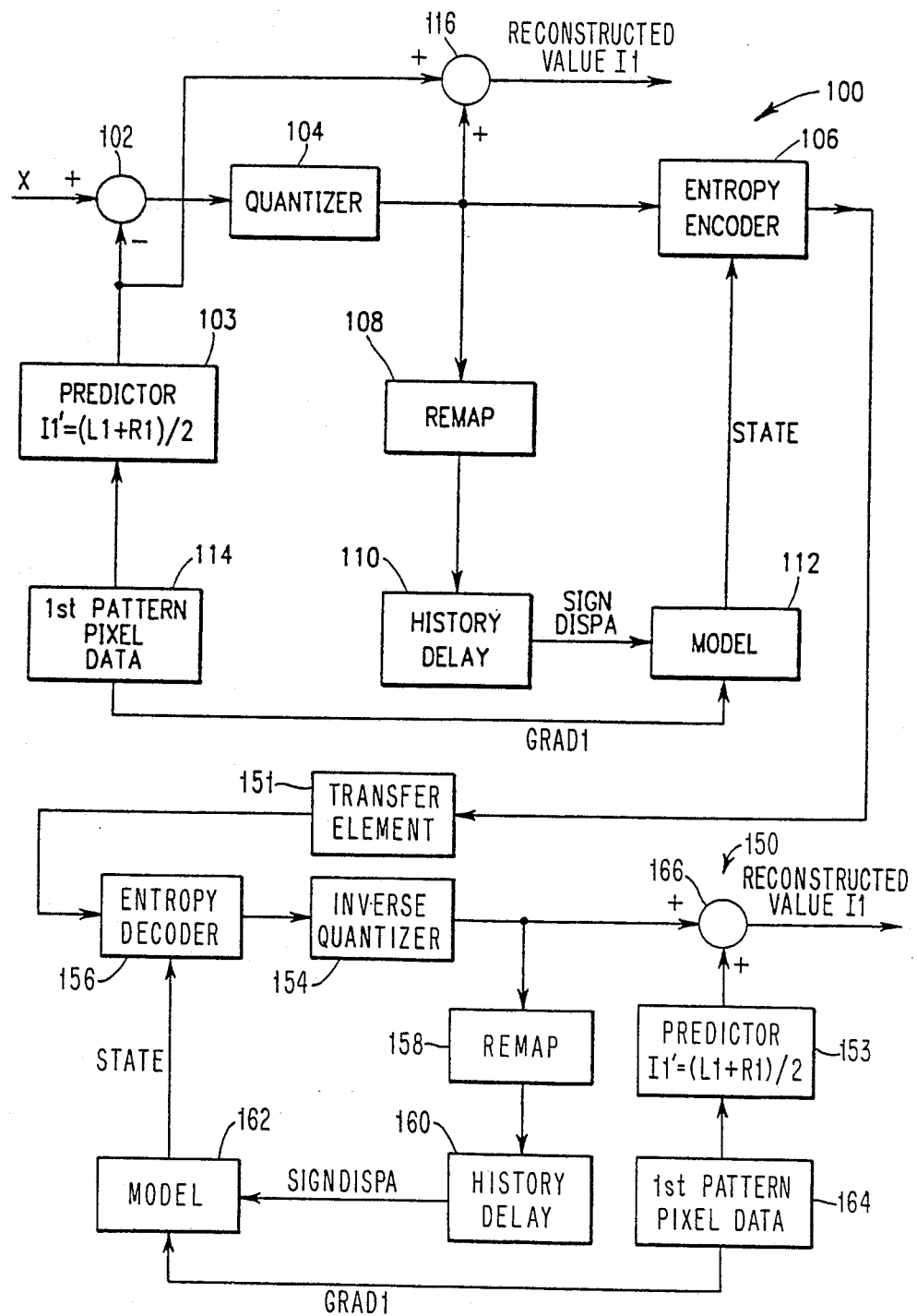
FIG. 3 is a block diagram of elements employed in implementing the first stage of the algorithm for the preferred embodiment, which involves compressing the data of pixels located in rows that include previously coded and re-constructed first pattern pixel values. Also included in this figure is a corresponding decompressor which decompresses entropy encoded compressed data.

Referring now to FIG. 3, a specific data compression system 100 for implementing the first stage is shown. The graylevel value X for pixel i1 enters a subtractor 102 together with a predicted value $I1'=(L1+R1)/2$ from predictor element 103. The difference value $(X-I1')$ enters a quantizer 104. The quantizer 104 assigns the difference value to one of a plurality of predefined quantization levels. A preferred quantization table is set forth below in Table 1.

TABLE 1

QUANTIZATION TABLE

| Prediction difference | | Binary stream | Quantized value |
|---|---|---|---|
| from | to | QDIF | EX |
| −256 | −105 | hex ff | −112 |
| −104 | −89 | hex fe | −96 |
| −88 | −73 | hex fc | −80 |
| −72 | −57 | hex f8 | −64 |
| −56 | −41 | hex f0 | −48 |
| −40 | −25 | hex e0 | −32 |
| −24 | −13 | hex c0 | −18 |
| −12 | 12 | hex 00 | 0 |
| 13 | 24 | hex 40 | 18 |
| 25 | 40 | hex 60 | 32 |
| 41 | 56 | hex 70 | 48 |
| 57 | 72 | hex 78 | 64 |
| 73 | 88 | hex 7c | 80 |
| 89 | 104 | hex 7e | 96 |
| 105 | 255 | hex 7f | 112 |

The column under "binary stream" is described hereinbelow. EX represents the quantized value of input pixel difference.

The quantization value (or level) serves as an input to an entropy encoder 106. The entropy encoder 106 may include the Q-Coder described in the aforementioned co-pending patent application or may include any of various known arithmetic coders (e.g. Huffmann coders or Elias coders) or other coders which, given a state input and a decision input, provide an output having a length based on the probability of the decision outcome.

The output of the quantizer 104 also enters a remap element 108. The remap element 108 evaluates whether the quantized output has a "sign" of zero, −, or +. A history of remapped sign values is contained in a delay 110. The remapped value for pixel A1—zero, negative, or positive—is assigned a corresponding SIGNDISPA value of hex 000, hex 040, or hex 080. The value of SIGNDISPA enters a model element 112.

A second input also enters the model element 112. In particular, from data corresponding to pixels in the first pattern (of hatched pixels), a gradient value for pixel i1 is determined. The gradient is defined as:

$$Gradient = I1' - L1 = (R1 - L1)/2$$

The gradient value is re-mapped to one of four values, GRAD1(x), according to the following table, where $x = abs(I1' - L1)$:

TABLE 2

| Input x | GRAD (x) |
|---|---|
| 0 to 12 | hex 00 |
| 13 to 24 | hex 10 |
| 25 to 40 | hex 20 |
| 41 to 128 | hex 30 |

The above definition of GRAD1(x) has been chosen so that 16 bytes (hex 10) will separate the beginning of the statistics for different contexts or states. This separation allows for storage of the statistics of four binary decisions in the Q-coder described in the co-pending application; these decisions correspond to the four topmost decisions in the binary tree described hereinbelow.

It is noted that the predicted value I1' is used in the gradient calculation. The I1' value, which is derived from data stored in the first pattern image data store 114, thus serves a dual purpose and reduces computation requirements. It is also noted that, because the resulting gradient is half the value of $(R1-L1)$, the GRAD1(x) look-up-table is halved in size.

The value GRAD1(x) and SIGNDISPA are concatenated by the model element 112 to form a state input for the entropy encoder 106. Taken together, the four GRAD1(x) possible values and the three possible SIGNDISPA values provide 12 possible state inputs to the entropy encoder 106. The model 112 may thus be viewed as a 12-state Markov-type model which uses the magnitude of the gradient computed from the left and right neighboring pixels, together with arithmetic sign history information, to define decisional context (i.e., the state input) for entropy coding.

Still referring to FIG. 3, it is noted that a re-constructed value for pixel i1 is computed by combining the predictor value I1' and the quantized value in summing element 116. The sum is clipped as appropriate to maintain a value within the range of values between 0 and 255. The re-constructed values (which approximate the original graylevel values) are used in second stage computations.

In FIG. 3, a first stage decompressor 150 is also illustrated. The compressed output from first stage compressor 100 enters the first stage decompressor 150 via a transfer element 151. The transfer element 151 includes a communication medium and may include a storage medium. The first stage decompressor 150 includes an inverse quantizer 154 and entropy decoder 156.

The entropy decoder 156 decodes a QDIF value (in Table 1) given the compressed data and state inputs thereto. The inverse quantizer 154 converts QDIF to a corresponding EX value (also in Table 1). The other elements of the decompressor 150 are functionally the same as their counterparts in the compressor 100. Elements 103, and 108 through 116 correspond respectively to elements 153 and 158 through 166.

It will be noted that the re-constructed value may differ from the input value, due to error which may be introduced due to the quantization step. When the input graylevel varies from the re-constructed value, the compression is referred to as "lossy". The amount of loss is determined by the quantization table. When each difference value is mapped to itself in the quantization table, there is zero lossiness. On the other hand, the more difference values allocated to each quantization level, the greater the degree of lossiness.

The present invention is applicable to zero loss and lossy compression.

Figure 4:
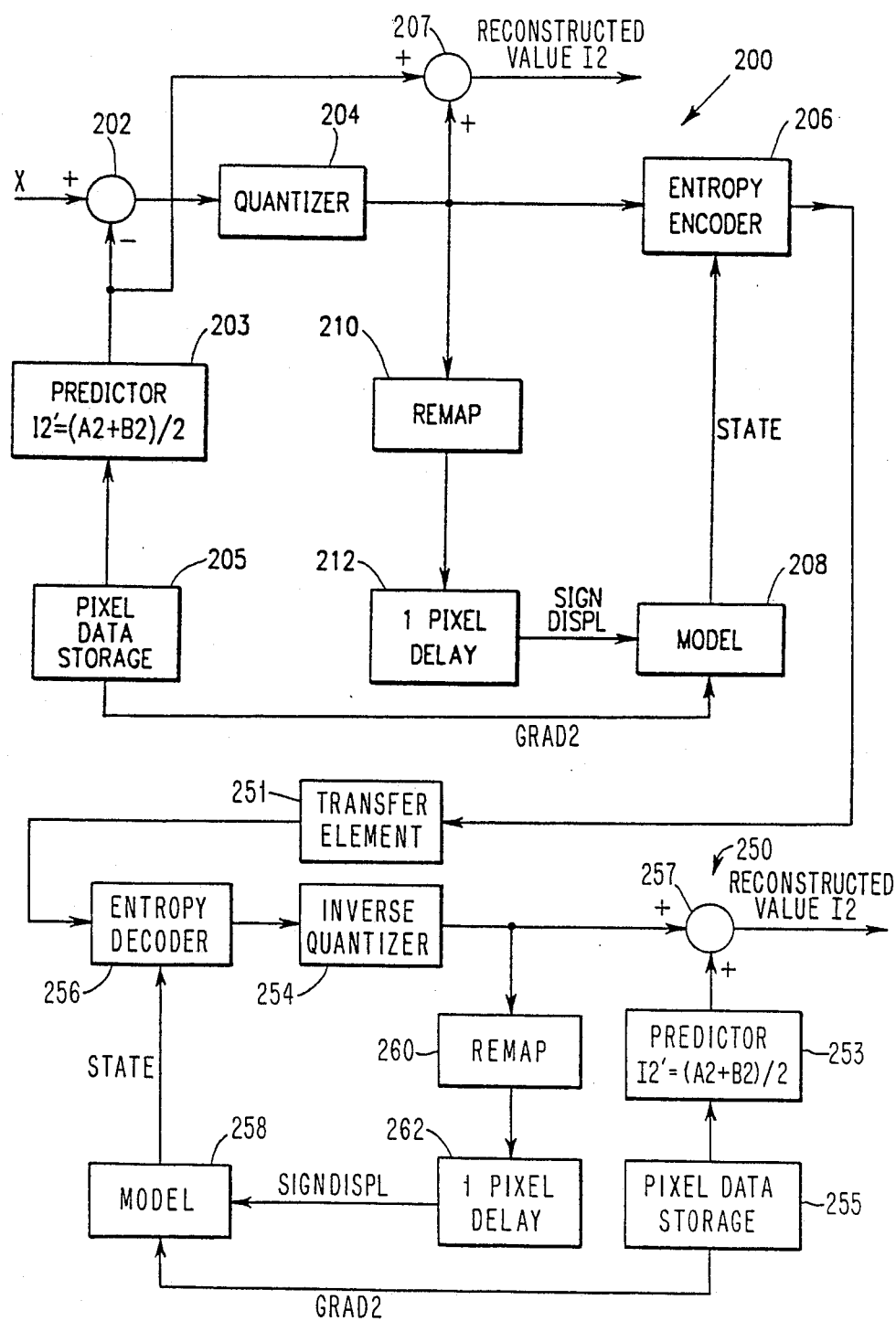
FIG. 4 is a block diagram of elements employed in implementing the second stage of the algorithm for the preferred embodiment, which involves compressing the data of pixels located in rows that do not include first patterns pixels. Also included in this figure is a corresponding decompressor which decompresses entropy encoded compressed data.

Referring to FIG. 4, a data compression system 200 implementing the second stage of the algorithm is illustrated. The graylevel value for pixel i2 (see FIG. 2) is shown entering a subtractor 202. A predicted value I2′ produced by a predictor 203 according to the expression $I2' = (A2 + B2)/2$ is subtracted from the value X, the difference (i.e., the prediction error) serving as input to a quantizer 204. The values combined in the predictor 203 are entered from storage 205. Storage 205 contains re-constructed values for pixels previously processed, e.g. A2, B2, and L2. Re-constructed values for the second stage are generated by combining the quantizer output with the predictor output in a summer 207. The output of the summer 207 is a re-constructed value I2 for pixel i2.

The quantizer 204 operates like quantizer 104 and may include the same quantization values as in Table 1.

As in FIG. 3, the compression system 200 of FIG. 4 provides the quantized values to an entropy encoder 206. A state input to the entropy encoder 206 is furnished by a model element 208. A first input to the model element is GRAD2(x) which is defined as a "vertical" gradient relative to pixel i2. In the present embodiment, the gradient is $(I2' - A2)$. As discussed with reference to the gradient value in FIG. 3, the gradient value in system 200 is re-mapped to a fewer number of values GRAD2(x) based on Table 2. GRAD2(x) provides a one out of four possible input values to the model element 208. The other input to the model element 208 is determined by means of a re-map element 210 and a 1-pixel delay element 212. The re-map element 210 preserves the sign value of the quantized value output from the quantizer 204. Either a zero, −, or +value is assigned. The 1 pixel delay serves to store the re-mapped value for the previously processed pixel in the row, i.e. pixel L2. The three sign values are defined as hex 000, hex 040, and hex 080, respectively. The appropriate hex value is supplied to the model element 208 as SIGNDISPL. The state input may be the concatenation of GRAD2(x) and SIGNDISPL.

In practice, however, the sign value (i.e. SIGNDISPA or SIGNDISPL depending on stage) and GRAD value (i.e., GRAD1 or GRAD2 depending on stage) are added. For each stage, the sign values and GRAD values thereof are defined so that the adding of a given sign value and a given GRAD value provides a unique sum, the unique sum representing an address to corresponding state input statistics.

Also in FIG. 4, a second stage decompressor 250 is illustrated. The compressed output from second stage compressor 200 enters the second stage decompressor 250 via a transfer element 251. The transfer element 251 includes a communication medium and may include a storage medium. The second stage decompressor 250 includes an inverse quantizer 254 and entropy decoder 256.

The entropy decoder 256 decodes a QDIF value (in Table 1) given the compressed data and state inputs thereto. The inverse quantizer 254 converts QDIF to a corresponding EX value (also in Table 1). The other elements of the decompressor 250 are functionally the same as their ounterparts in the compressor 200. Elements 203, 205, and 207 through 212 correspond respectively to elements 253, 255 and 257 through 262.

Referring again to Table 1, the binary stream QDIF is now discussed in more detail. It is observed that the prediction difference is quantized into one of 15 possible levels allowed by the quantization table.

The entropy encoder (106/206) must then assign different code words to each one of these quantization levels, such that the code words are uniquely decodable. If the entropy encoder is a binary arithmetic coder as described in the aforementioned Q-Coder patent application, multilevel data must be converted into binary data to enable the entropy encoder (106/206) to process it.

Figure 5:
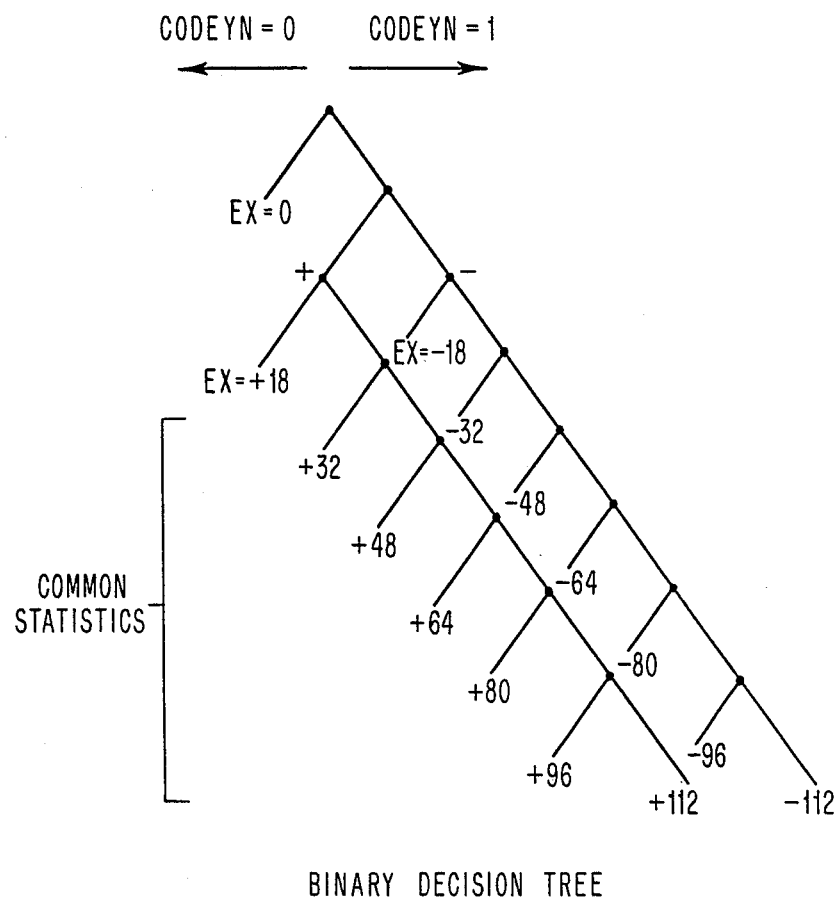
FIG. 5 is an illustration showing a tree structure used in converting a multivalue graylevel into a binary stream which can be encoded by a binary arithmetic coding encoder.

The binary decision tree shown in FIG. 5 is used to achieve this conversion. The binary sequence that represents a given quantization level is determined by following the tree from the root down to the corresponding leaf. If the left-branch is followed, a "zero" is encoded; otherwise a "one" is encoded.

Each state normally has associated with it a separate tree. This means that probability distributions associated with trees corresponding to different states are estimated separately. Furthermore, within each tree (or state), each binary decision should be estimated separately from other binary decisions. These requirements could translate into separate storage allocations for the statistics of each one of the nodes in each tree. However, in the present implementation, some decisions have been consolidated and are represented by "common statistics" under a single statistic or storage cell, regardless of the state. This last feature reduces the storage requirements to four binary decisions per tree with a minimal impact, if any, on compression. The common statistics are shown in FIG. 5.

The tree of FIG. 5 is not required when the entropy encoder 106/206 is capable of processing multilevel decision inputs.

Table 1 shows a hexadecimal code for the binary decision stream, which can be used for efficiently traversing the decision tree. In the present embodiment, the value of QDIF is loaded into a byte-size register which is then tested to encode the decision 0 versus not 0. If the result is not zero, the most significant bit of the binary stream is tested for the occurrence of a positive sign (0) or a negative sign (1). Shifting this register to the left by two bits leaves the binary representation of the remaining decisions of the tree. By sequentially examining the most significant bit (the sign of the register contents) and shifting the register to the left by one, the tree is traversed. A leaf is reached whenever a zero (a nonnegative sign in the register) is encountered.

Figure 6:
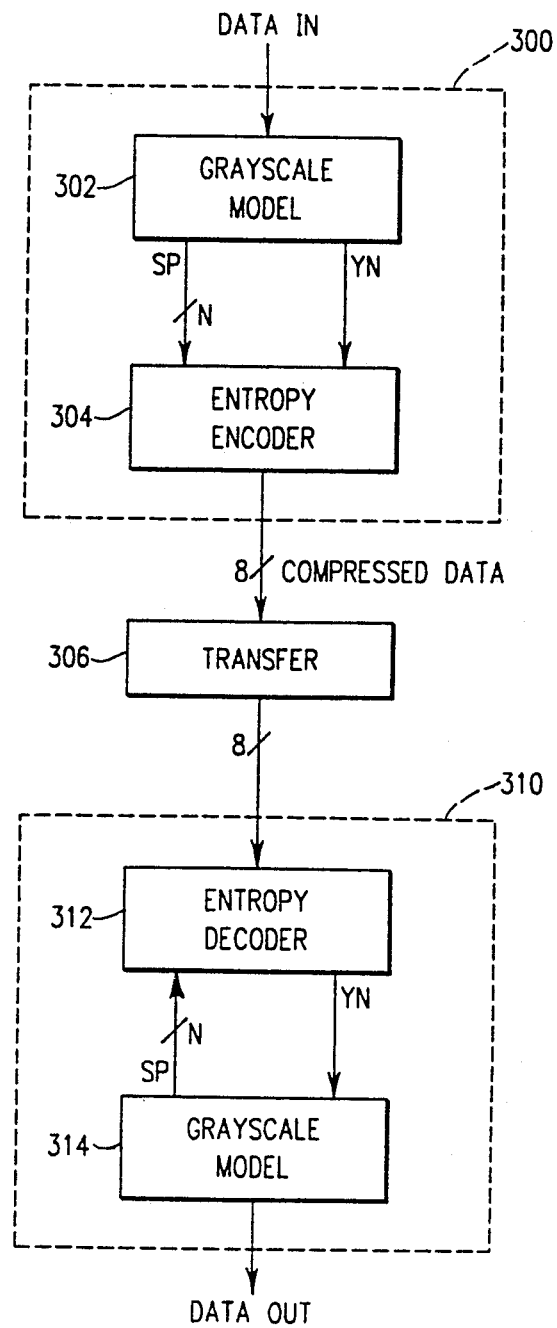
FIG. 6 is a block diagram which generally illustrates graylevel modelling and entropy coding operating in combination.

Referring to FIG. 6, the data compression and decompression aspects of the invention are shown. Specifically, the compressor 300 is shown to include a graylevel model 302 and an entropy encoder 304. The compressor 300 includes the elements of FIGS. 3 and 4. The YN line to the encoder 304 corresponds to the quantized value (in binary form) which enters the entropy encoder 106/206 (of FIG. 3 and FIG. 4). SP is the state input which, in the present embodiment, points to a specific probability in a table of probabilities used by the entropy encoder 106/206 to define decision context. The compressed data from the compressor 300 is communicated (with or without intermediate storage) via a transfer element 306 to decompressor 310. The decompressor 310 includes an entropy decoder 312 which operates in inverse fashion to entropy encoder 304. A graylevel model 314 provides a state input to the decoder 312, pointing the decoder to the same probability entry in the probability table as is pointed to in the encoder 304 during encoding. From the compressed data and the state input, the entropy decoder 312 provides a binary output YN to a graylevel model element 314. The graylevel model element 314 corresponds to the model 302, and is thereby able to generate output DATAOUT that corresponds to the DATAIN which enters the compressor 300.

The above-described system has been implemented in both the IBM S370 and the IBM PC-AT. The statistics area used in coding the quantized prediction difference consists of 12 contiguous cells, each corresponding to a given state or context. Each cell has 16 bytes of storage assigned to the statistics of four binary decisions; they correspond to the four topmost nodes in the decision tree of FIG. 5. The following diagram, in which each box represents a 4-byte unit, illustrates this structure:

```
EX = 0     vs EX   = 0
EX > 0     vs EX   < 0
EX = -18   vs EX   < -18
EX = 18    vs EX   > 18
```

Other binary decisions in this tree are computed using a single 4-byte statistic area common to all states (STATBITSLEFT). In the following text and charts, the 4-byte statistics unit that is to be used by the entropy encoding unit (e.g., the Q-coder) is always pointed by the pointer SP.

2. Flowcharts

To aid in the discussion of the following flowcharts, a list of definitions is set forth below

| | |
|---|---|
| CODEYN | Binary decision encoder |
| YN | YN = 0 means 0 was decoded. YN = 0 means a 1 was decoded |
| SP | Pointer used for the statistics of the current binary decision |
| STAT1 | Statistics storage area for the first stage processes (GSE1A and GSD1A). |
| STAT2 | Statistics storage area for the second stage processes (GSE2A and GSD2A) |
| STATBITSLEFT | Storage for common statistic binary decisions. |
| HP | Pointer used for the original pixel data. All other history and re-constructed lines are at a fixed displacement from this pointer (i.e., I1, R1, L1, A2, B2, L2, SIGNDISPA, etc.) |
| BUFFI | Input buffer contains a line of original pixels |
| LSIZE1 | Size of input first stage line |
| LSIZE2 | Size of input second stage line |
| TEM | Temporary register used in intermediate ALU operations |
| TPOINTER | Temporary pointer used to access look-up-tables |
| DLUT | Look-up-table used in the encoder's evaluation of QDIF (see Table 1) |
| GLUT | Look-up-table used in the evaluation of GRAD —GRAD1 or GRAD2 |
| QLUT | Look-up-table used in the evaluation of EX (see Table 1) |
| MASK | Temporary variable used in the decoder's evaluation of QDIF. |
| X | Input pixel value for either stage |
| I' | Interpolated predicted value of the input pixel |
| I | Re-constructed value for the input pixel |

Bold lettering in the flowcharts indicates that a more detailed flow chart can be found elsewhere. Identical processes for encoder and decoder are often given in old lettering and explained in a separate figure (even when it is just a simple calculation) to emphasize the commonality. All multiplications (*) and divisions (/) are by powers of two; they are implemented with the appropriate shifts to the left or right (SLL or SRL). Flowcharts for similar functions (with implementation variations) are shown in sequence.

Figure 7:
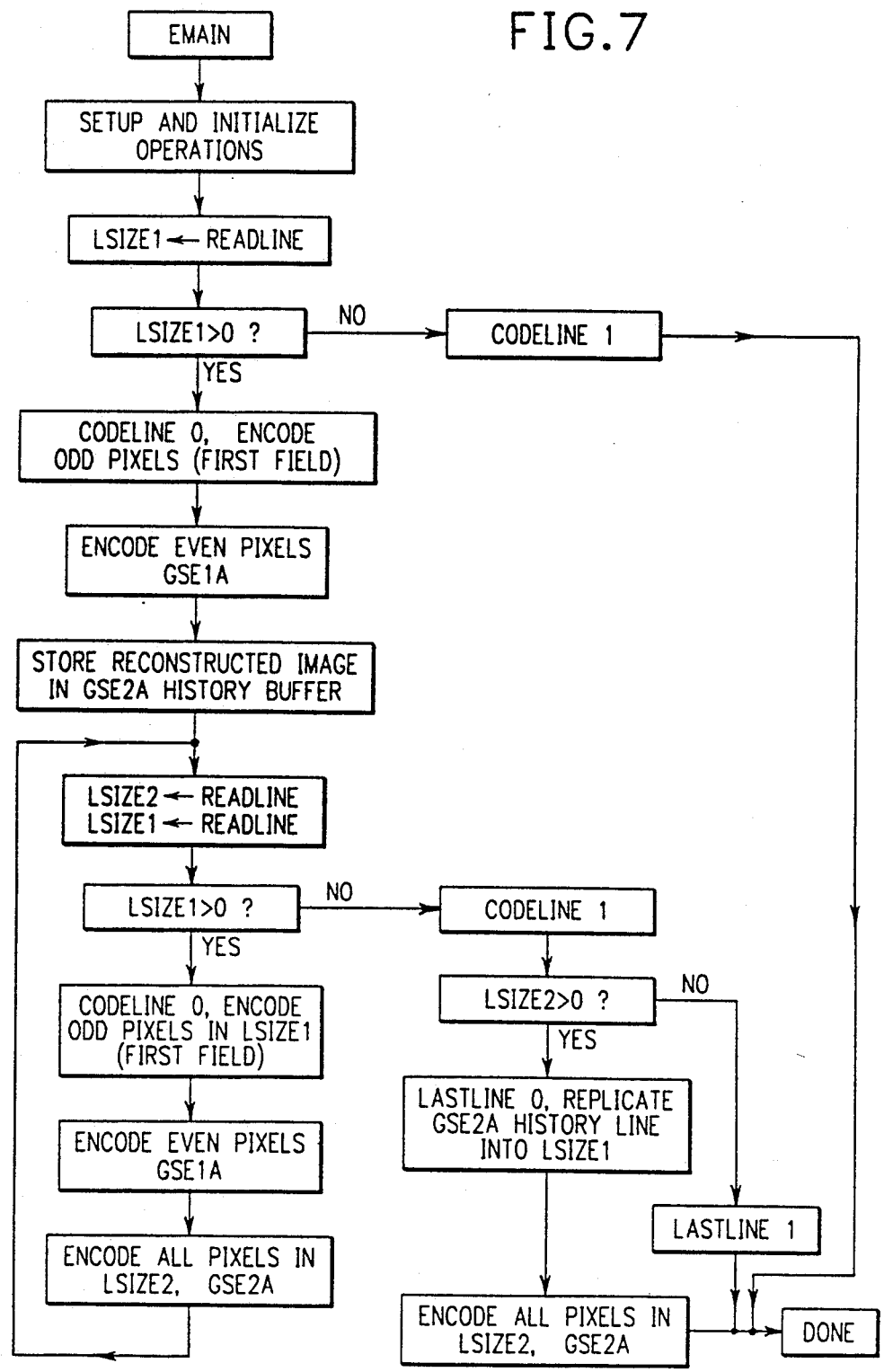
FIG. 7 is a flowchart illustrating the encoding, or data compressing, portion of the invention.

FIG. 7 shows the basic structure of the compression (encoding) portion of the present graylevel compression/decompression system. The encoder process is labelled as EMAIN. After any required setup and initialization operations, the first line to be encoded is read by READLINE; assuming that this line is not null, the odd pixels (i.e., pixels of the first pattern) are encoded and re-constructed by some known technique. The even pixels are then encoded and re-constructed by GSE1A (FIG. 8), which corresponds to the first stage of the pixel processing.

After storing the re-constructed first line as a history line, the main recursion of the encoding system is entered. In this recursion, there is always an attempt to read two successive lines. If successful, the second line is encoded and re-constructed by using the known technique on the odd pixels and GSE1A on the even pixels. The newly reconstructed line, together with the history line can now be used to encode (and re-construct) the intermediate line by using GSE2A (FIG. 9), which corresponds to the second stage of pixel processing. The re-constructed second line now becomes the history line for the next pass in the recursion.

FIG. 7 also illustrates one of several possible ways of handling a dangling second field line when the recursion is finished. After replicating the history line into the reconstructed first stage line, the dangling line is simply encoded by using GSE2A.

In FIG. 7, CODELINE and LASTLINE represent binary decisions that are encoded to indicate whether more lines are present (LSIZE1 or LSIZE2 not zero). In the present preferred system, these decisions are encoded by using the entropy coder (e.g., Q-coder), as if they were part of the binary stream generated by GSE1A or GSE2A. Fixed probabilities are assigned to these decisions.

Figure 8:
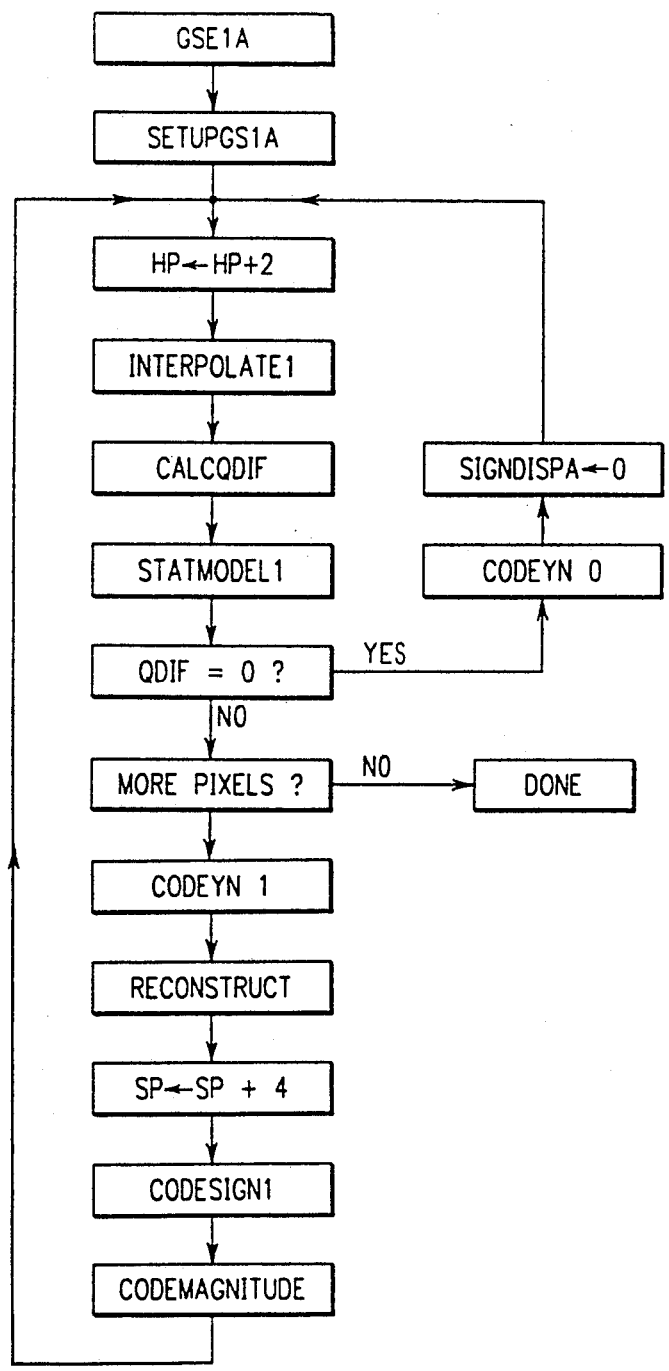
FIGS. 8 through 20 and 22 through 26 are flowcharts illustrating processes embodied within the encoder or decoder portions of the preferred embodiment
Figure 10:
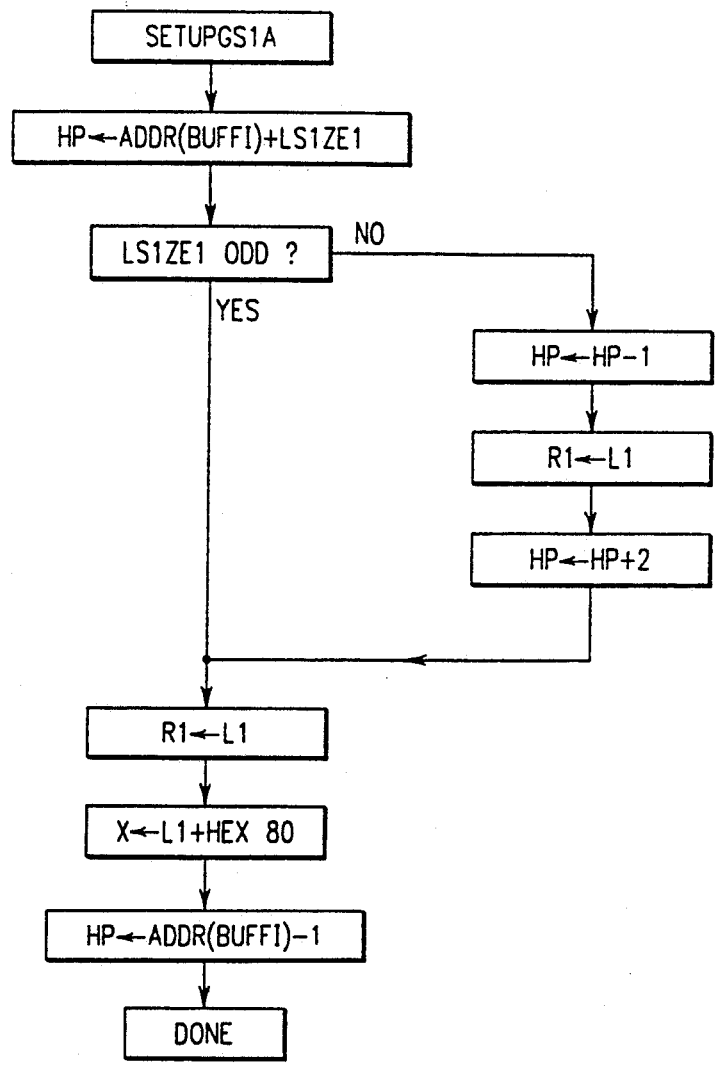
Figure 11:
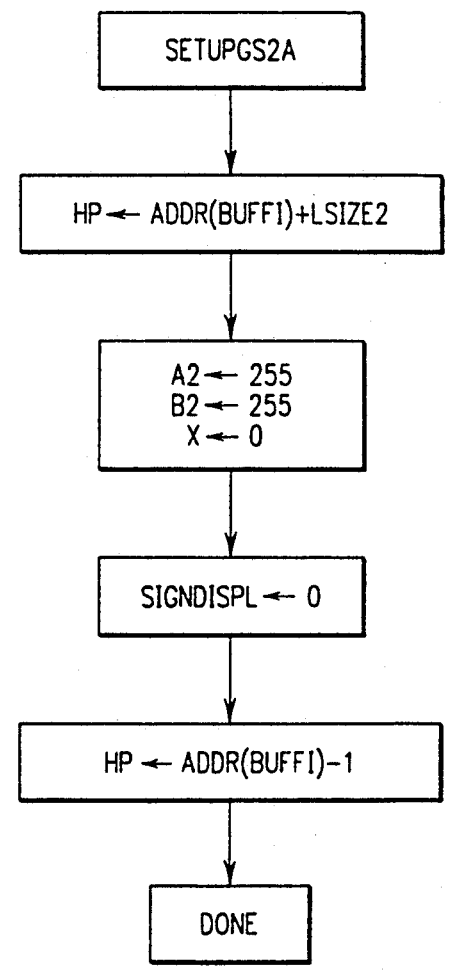
Figure 12:
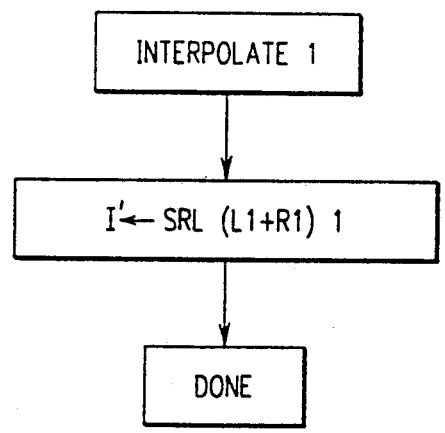

FIG. 8 shows a flow chart of the encoder used in the first stage of processing the pixels not in the first matrix pattern. After the initialization process takes place in SETUPGS1A (FIG. 10), the main recursion of the algorithm follows. Since in the first stage, only the even pixels are encoded, the HP data pointer is always updated by two inside the loop. INTERPOLATE1 (FIG. 12) calculates the predicted value I' for the input pixel value X, by averaging L1 and R1. CALCQDIF (FIG.

Figure 15:
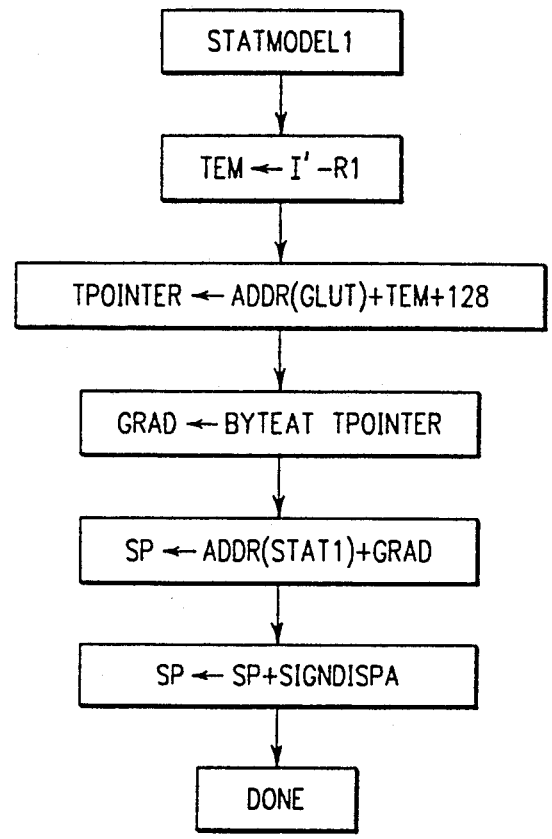

14) then obtains QDIF by a simple look-up-table operation on the difference between X1 and I1' (see Table 1). STATMODEL1 (FIG. 15) sets the SP statistics pointer to the correct address by first evaluating the gradient through another look-up-table operation, and then adding the value of GRAD to the address of the STAT1 statistics storage area. Further, the value of SIGNDISPA, which was stored as part of the history buffer of the previous first stage line, is also tagged on to SP.

The binary decision stream represented by QDIF can now be encoded. If QDIF is zero, no further correction is needed, as the value of I1' is also the value of the re-constructed pixel I1; thus a zero is encoded by CODEYN, and SIGNDISPA is reset to zero for the next first stage line. Note that SIGNDISPA is at a fixed offset from pointer HP and thus forms part of the history data used to encode successive first stage lines.

If QDIF is not zero, a test is made as to whether encoding of the input line is completed. This test is needed in the QDIF-=0 path only, as the initialization of SETUPGS1A forces this condition when the right edge of the input line is exceeded. In this manner, substantial computational efficiency over a system that performs this test for every pixel is achieved, as the statistics of the process will favor the QDIF=0 condition. Assuming that the right edge has not yet been reached, a one is encoded by CODEYN to indicate QDIF-=0.

Figure 17:
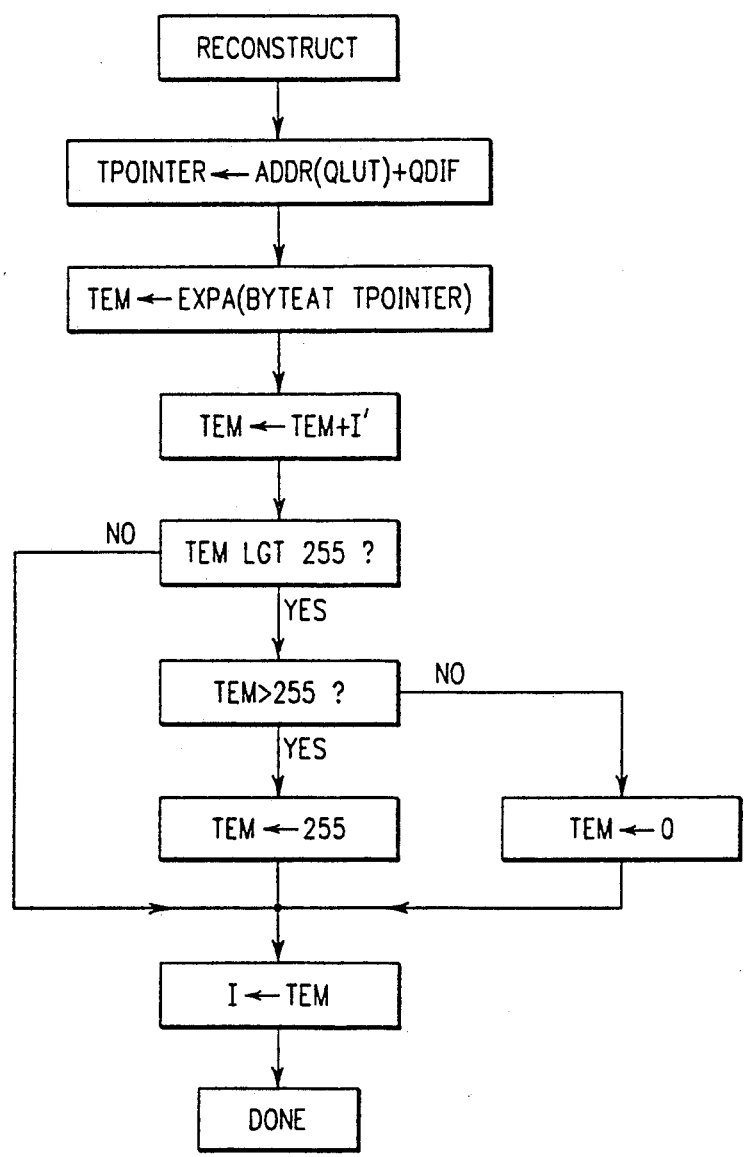

RECSTRUCT (FIG. 17) is now used to modify the interpolated pixel value to a "corrected" re-constructed value. The correction is obtained through another look-up-table operation using the value of QDIF as an index into the table (QLUT). The QLUT table provides the EX value in TABLE 1 corresponding to the QDIF value which is also shown in TABLE 1. A computationally efficient test is also made to insure that the corrected value does not overflow or underflow the byte-size pixels. The corrected pixel is calculated in the TEM register which should be at least two bytes wide. Using the two complement representation of negative numbers common to most computers, the test determines whether the contents of TEM are negative or greater than 255 by a single logical comparison against 255. This is illustrated in FIG. 17.

Figure 18:
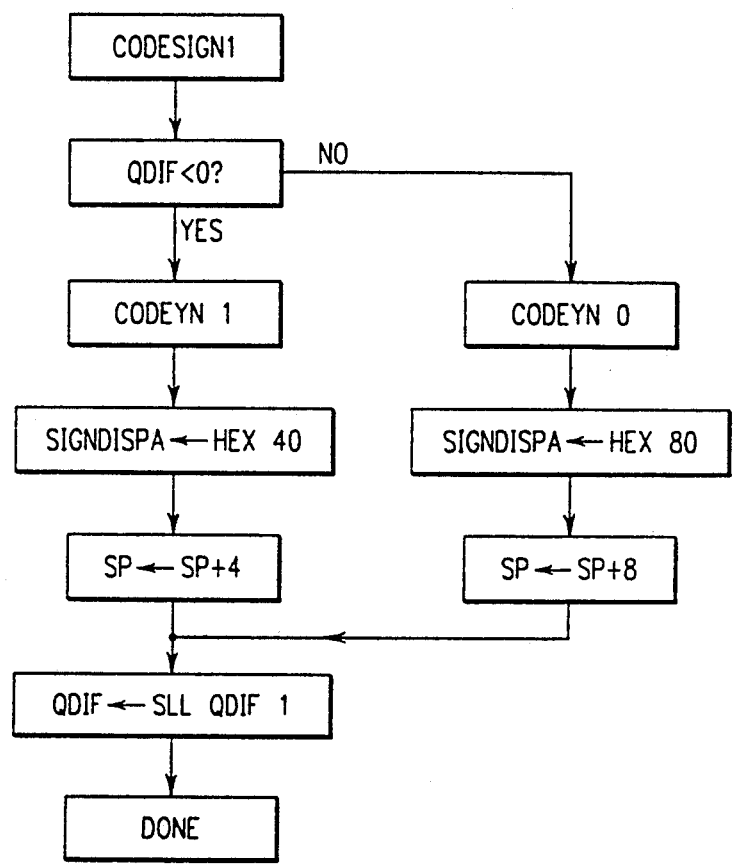
Figure 20:
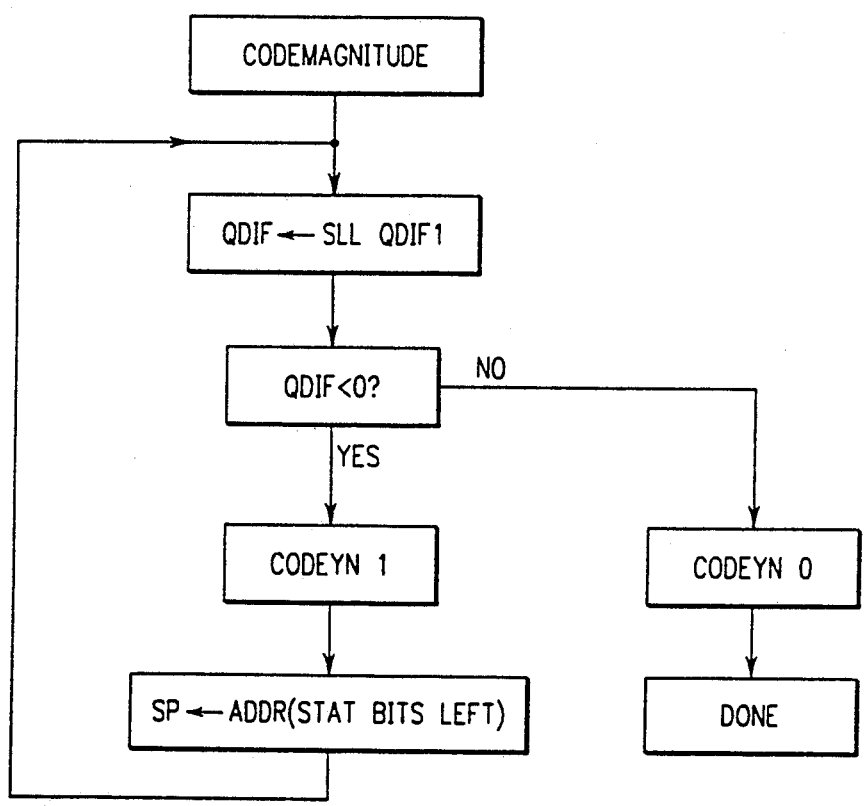

After updating the statistics pointer SP, encoding of the binary decision for the sign and then the binary stream for the magnitude is performed. These operations are performed in CODESIGN1 (FIG. 18) and CODEMAGNITUDE (FIG. 20) respectively. The recursion now proceeds with the next even pixel in the input line.

CODESIGN1 encodes the decision zero (positive QDIF) or one (negative QDIF) by a simple comparison and an invocation to CODEYN. It also resets the value of SIGNDISPA to be used in the next first stage line, updates the statistic pointer for the first magnitude binary decision, and finally shifts the msb in QDIF (the sign bit) out of the decision stream.

CODEMAGNITUDE (FIG. 20) encodes the binary decision stream that indicates the correct quantized magnitude. The encoding process is achieved by successive invocations to CODEYN after testing the msb in QDIF. This bit is shifted out of QDIF before every test and the loop is terminated when a zero msb in QDIF is present. The succession of bits is in effect a representation of the binary stream needed to reach a leaf in FIG. 5. CODEMAGNITUDE also resets the statistics pointer SP after the first decision is coded, to point to the area of common statistics.

Figure 9:
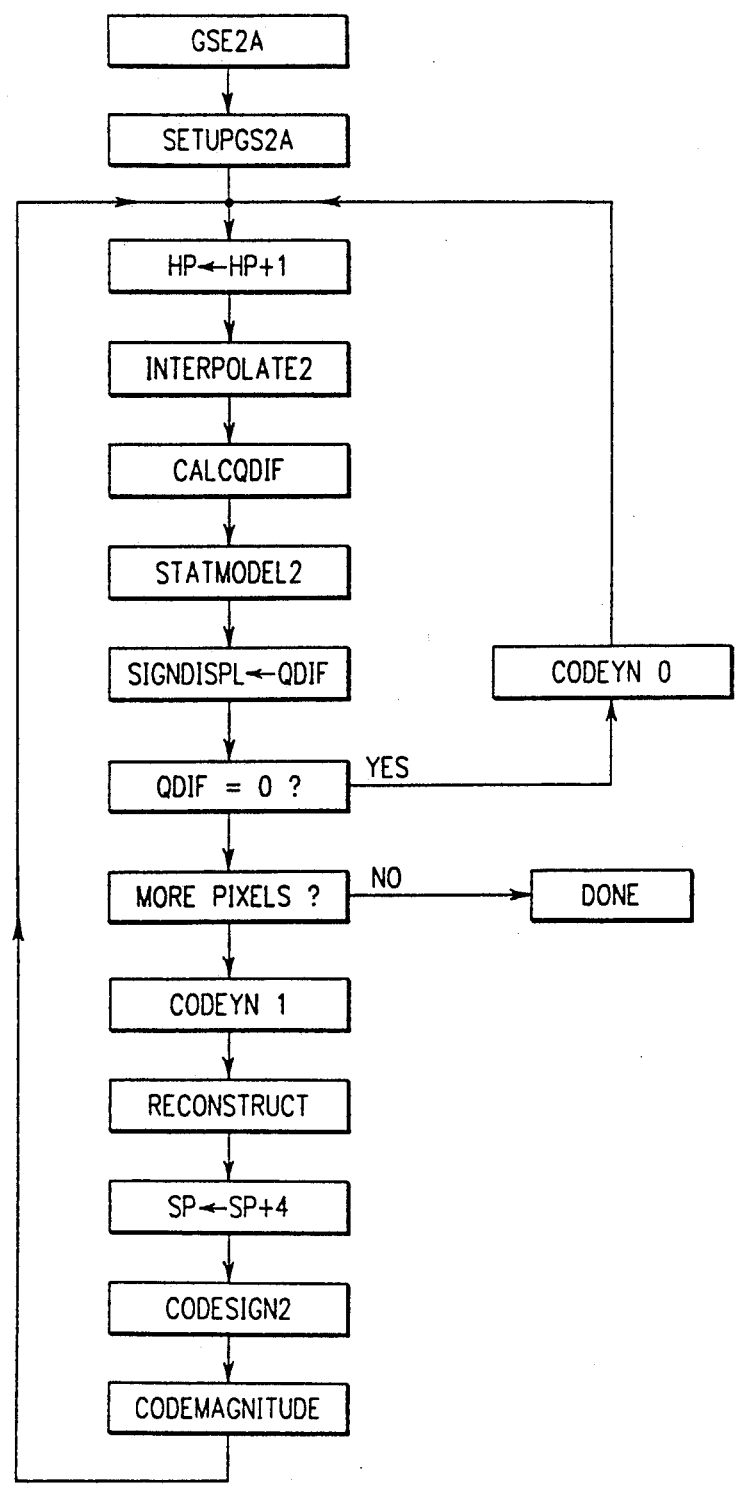
Figure 13:
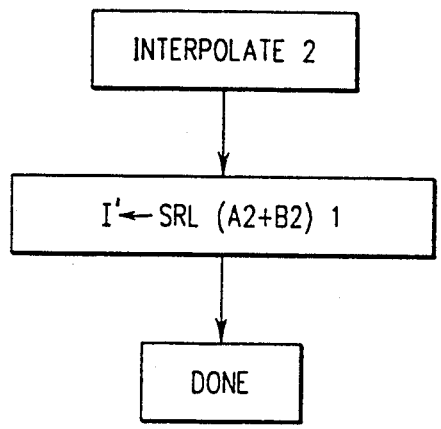
Figure 14:
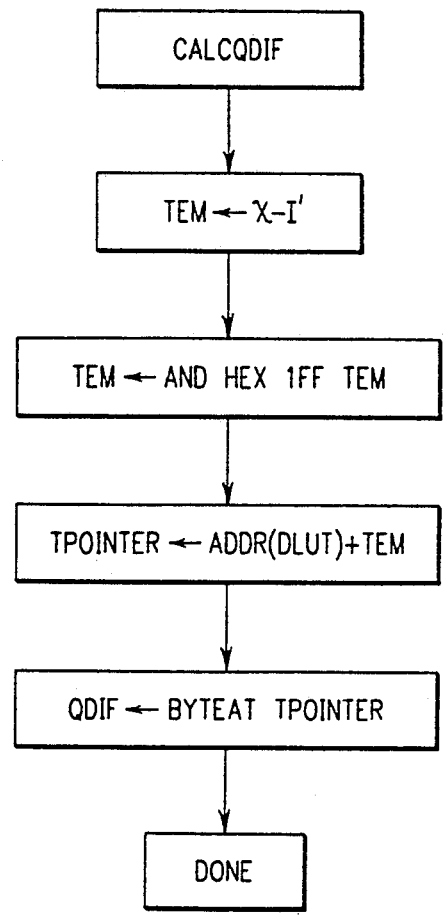
Figure 16:
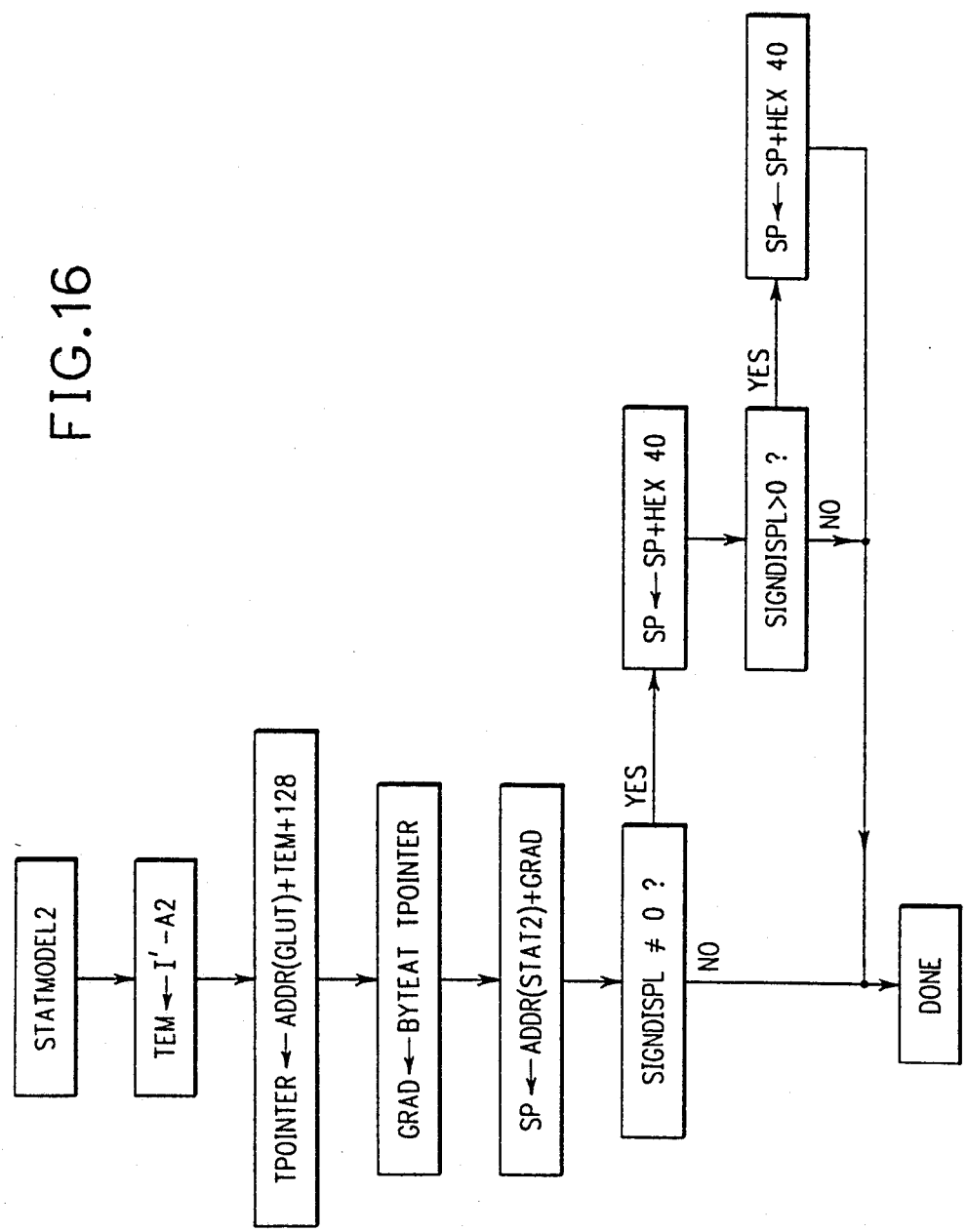

FIG. 9 illustrates a procedure that can be used to encode a missing line in the second stage of the second field matrix (GSE2A). By virtue of the symmetry of GSE1A and GSE2A, both processes are very similar; in fact, they share many of the same blocks. Minor differences do occur as explained in the main body of this disclosure. These differences require a different interpolation algorithm (INTERPOLATE2 in FIG. 13) and a symmetrical statistical modeler (STATMODEL2 in FIG. 16).

Figure 19:
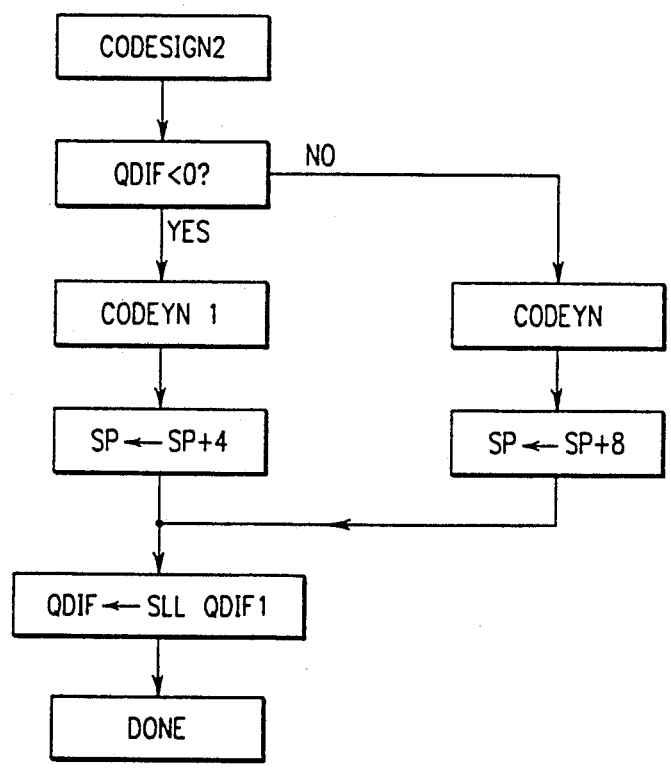

Although all functions are essentially symmetric and equivalent, computational efficiency demands some slight variations of detail. For example SIGNDISPL does not need to be stored as line history data and is better computed in STATMODEL2 rather than in CODESIGN1 as in GSE1A. This variation forces a different version for the second stage encoding of the sign (CODESIGN2 in FIG. 19). Functionally however, all of the abovementioned modules having implementation differences are equivalent or symmetrical.

Figure 21:
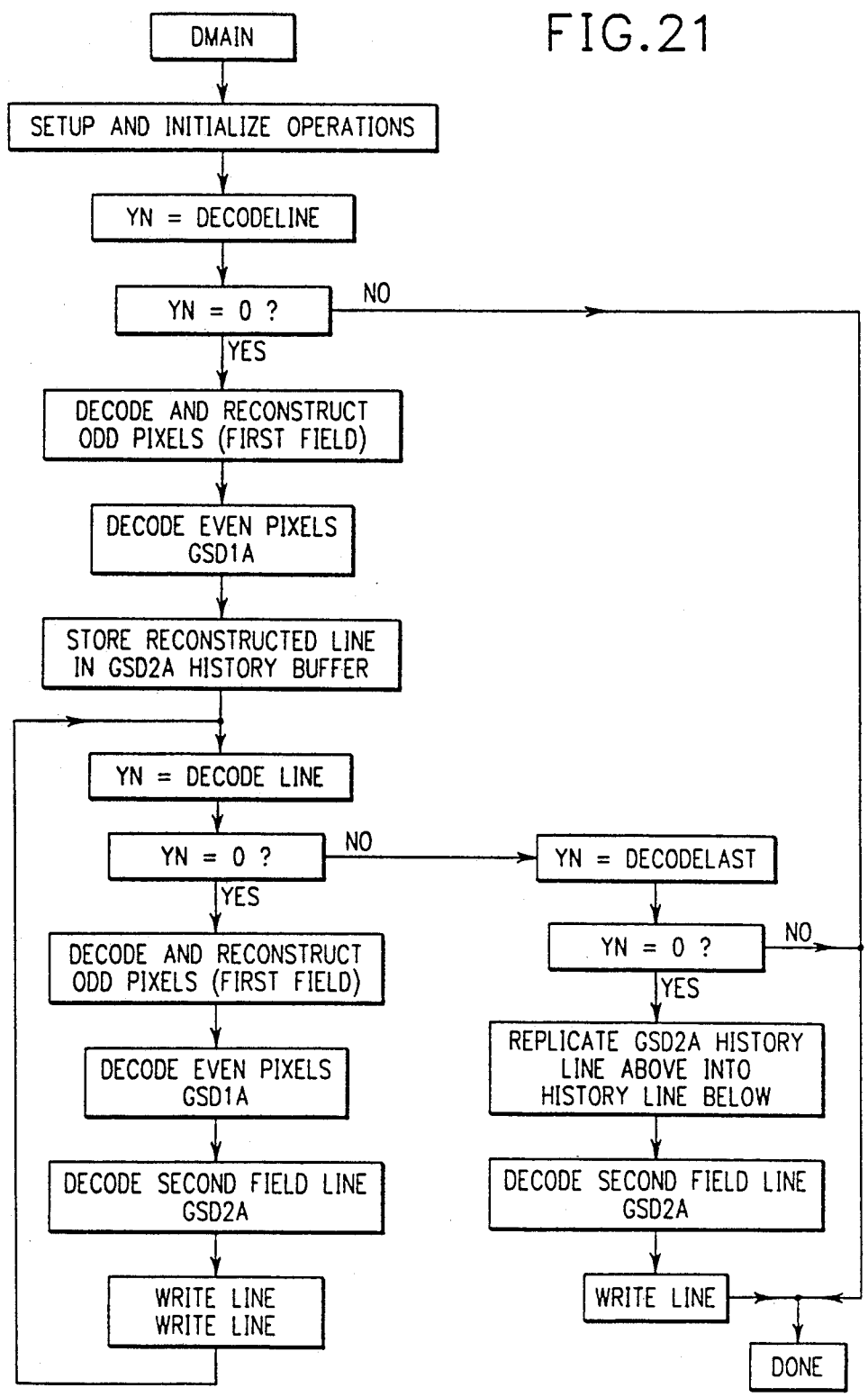
FIG. 21 is a flowchart illustrating the decoding, or data decompressing, portion of the preferred embodiment.
Figure 22:
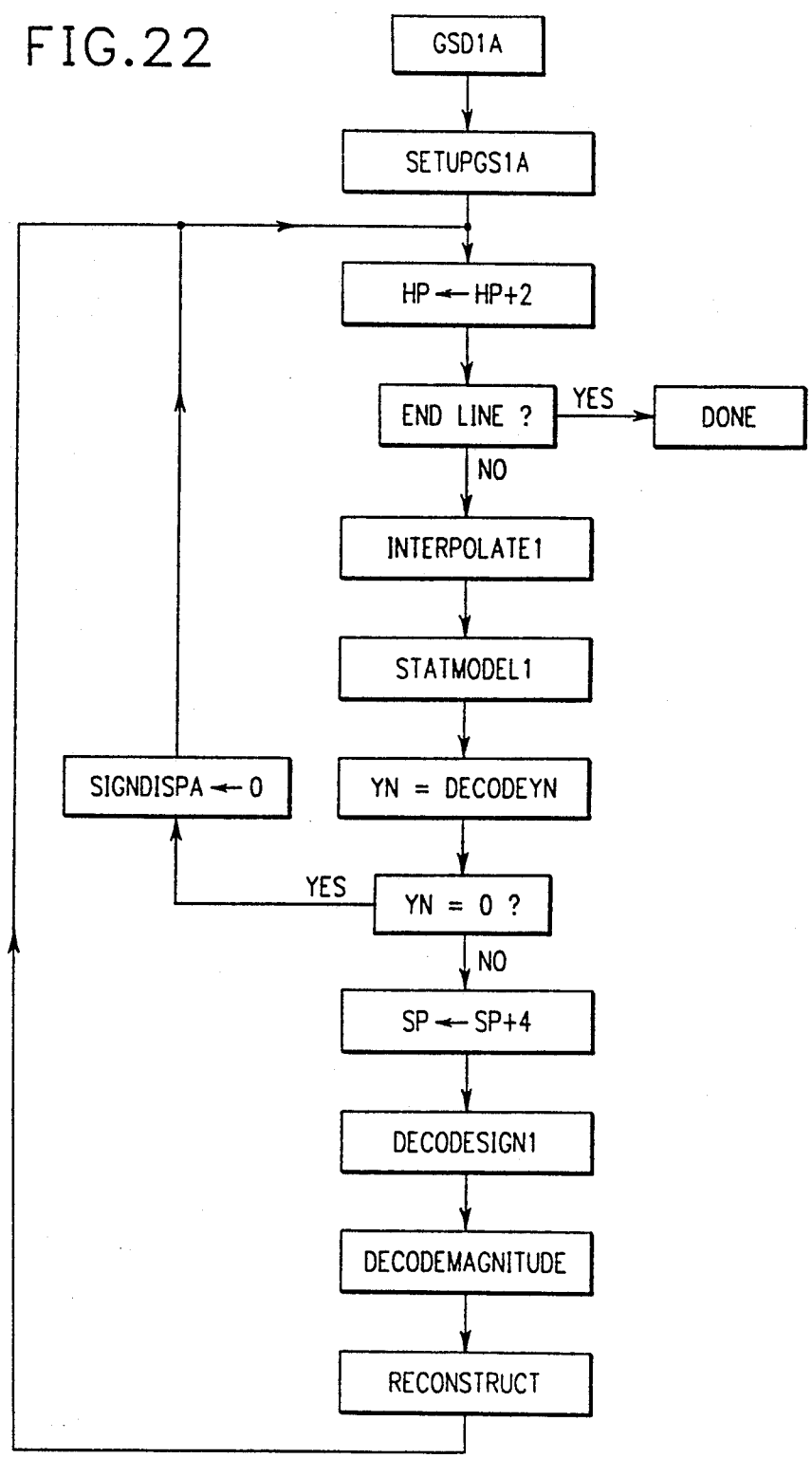
Figure 23:
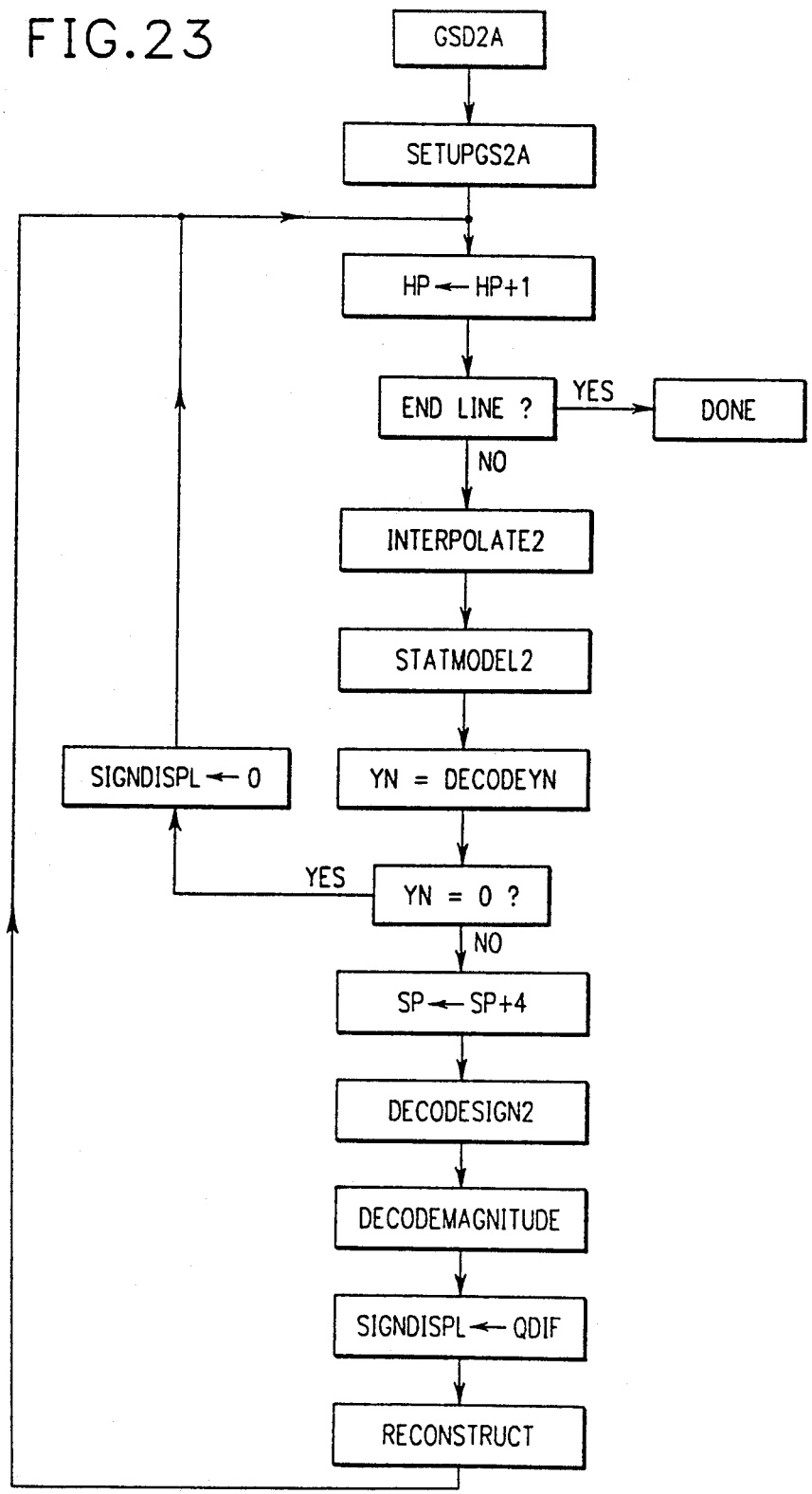
Figure 24:
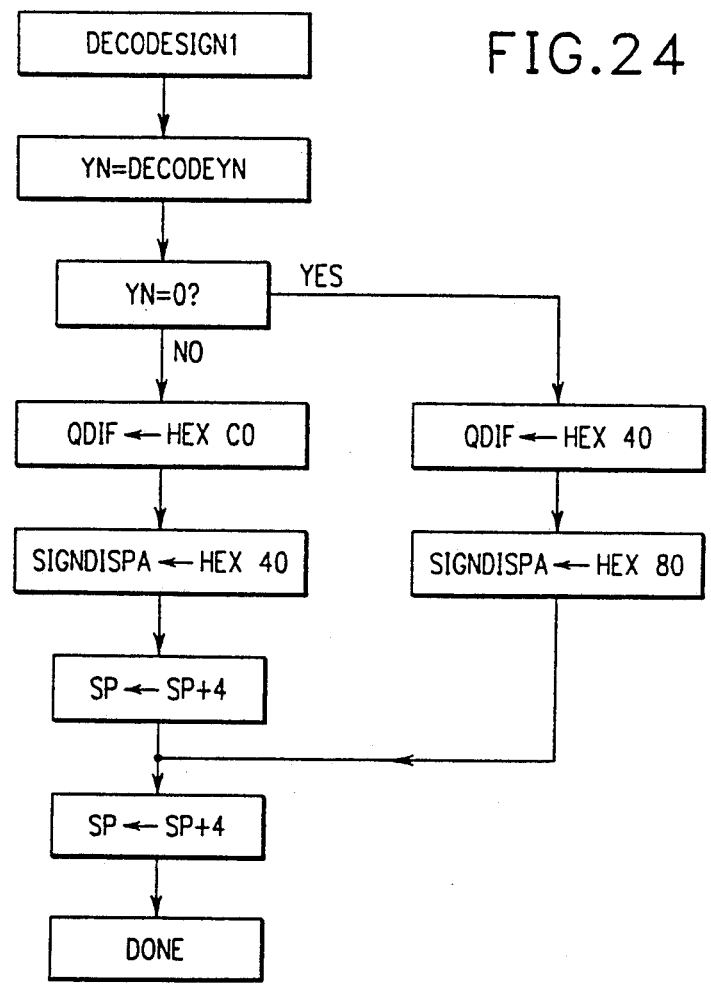
Figure 25:
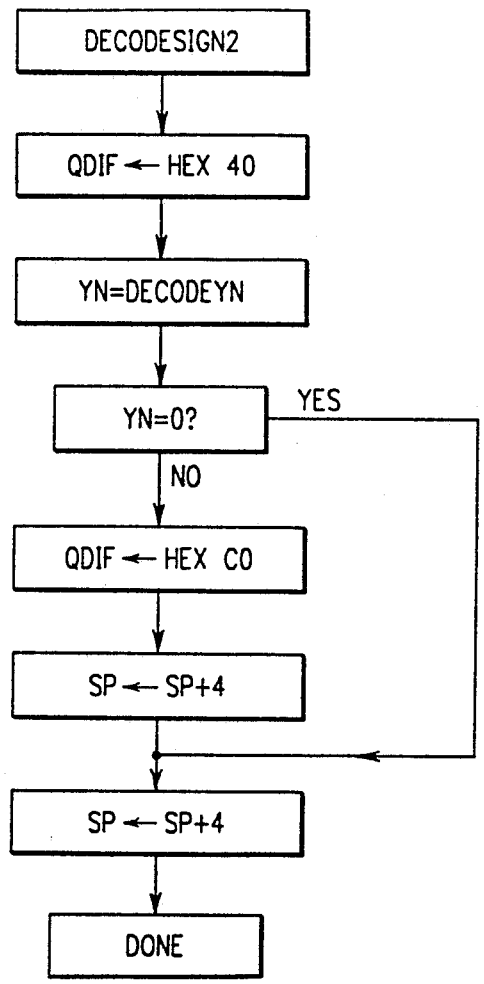
Figure 26:
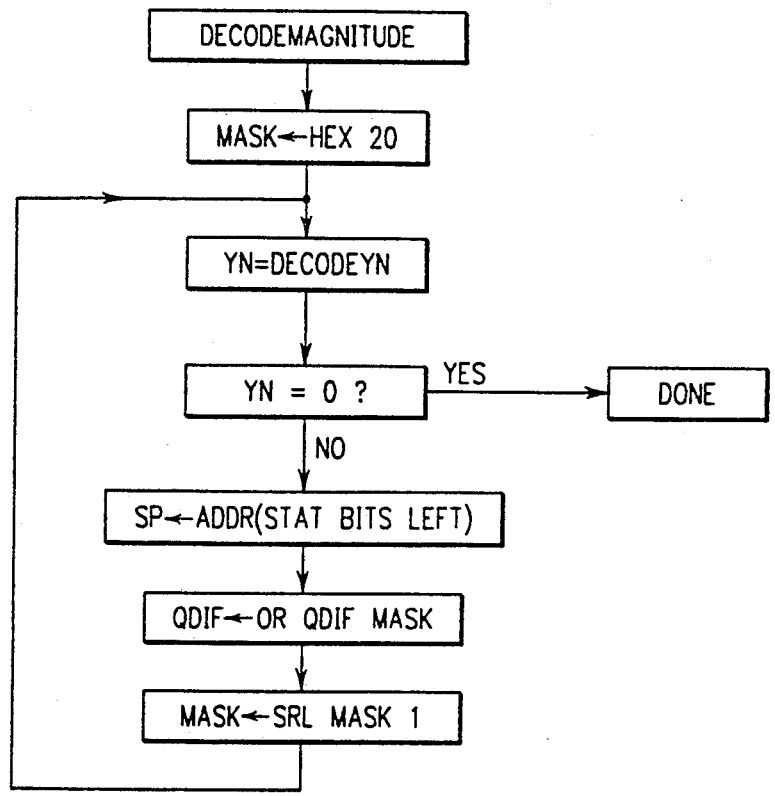

Finally, the decoders for the first and second stage algorithms are illustrated in FIGS. 21 through 26. The processes involved are essentially the reverse of those in the encoders and should be self-explanatory. FIG. 21 illustrates a decoding system, DMAIN, that reverses the operations of EMAIN. GSD1A and GSD2A decode the first stage and second stage compressed data and, therefore, reverse the action of GSE1A and GSE2A. Similarly, DECODELINE and DECODELAST decode the data generated by CODELINE and LASTLINE. It should also be noted that many of the same blocks used in the encoders appear in the flow charts for the corresponding decoders.

While the invention has been described with reference to preferred embodiments thereof, it will be understood by those skilled in the art that various changes in form and details may be made without departing from the scope of the invention. For example, the same entropy encoder may be used as encoder 106 and encoder 206 or, alternatively, separate encoders may be used. In addition, any of various entropy encoders—e.g. Huffmann coders—may be used with varying accuracy and outputs. Moreover, more intricate computations may be performed in generating, for example, gradient values. That is, instead of two values to determine gradient four values may be used. And, instead of one pixel being used in determining the SIGNDISPA or SIGNDISPL, several pixels may be used. Such variations, although within the contemplation of the invention, are not preferred.

As remarked hereinabove, the first pattern may differ from the alternate pixel of alternate row pattern described in the preferred embodiment. For example, referring to FIG. 1, it is noted that first pattern pixels in the third and fifth row are aligned with first pattern pixels in the first row. The invention contemplates that the first pattern pixels of the third row may be offset to the right one position, providing a staggered pattern in which first pattern (hatched) pixels in the odd rows of the first pattern are vertically aligned and first pattern pixels in the even rows of the first pattern are vertically aligned and in which first pattern pixels in odd rows are not aligned with first pattern pixels in the even rows. The processing would be similar to that described in the preferred embodiment described hereinabove, it being noted however that the sign value, used in the entropy model for coding pixel i1, would be determined from a pixel which was coded using the first stage in a previous row.

Further, the first pattern may include, by way of example, every fourth pixel in every fourth line. That is, in row 1, pixels $X_{1,1}, X_{1,5}, X_{1,9}, \ldots, X_{1,509}$ are previously coded and are in the first pattern; in the fifth row, pixels $X_{5,1}, X_{5,5}, X_{5,9}, \ldots, X_{5,509}$ are previously coded and are in the first pattern; and so on. The remaining pixels are not part of the first pattern. Encoding with this first pattern is demonstrated with reference to pixel $X_{5,3}$ as a first input pixel. Based on the values of $X_{5,1}$ and $X_{5,5}$, a GRAD1 value is determined. From pixel $X_{1,3}$ determined earlier in the first stage, a state input for the subject pixel is generated. Wrth $X_{5,3}$ coded, pixels $X_{5,2}$ may be then be processed—the GRAD1 value being based on $X_{5,1}$ and $X_{5,3}$. The entire row may be coded and re-constructed values for each pixel may be computed by successive steps of interpolation. Similarly, after first pattern rows are coded, the coding of interleaved rows containing no first patterns pixels may be performed. That is, given that all pixels in rows 1, 5, 9, . . . , 477 have been coded, second stage may be applied to code the remaining pixels. The operation of the second stage is demonstrated with reference to pixel $X_{3,5}$, assuming that $X_{3,4}$ was previously coded in the second stage. In processing pixel $X_{3,5}$, pixel A2 would be pixel $X_{1,5}$; pixel B2 would be pixel $X_{5,5}$; and the sign would be based on pixel $X_{3,4}$ (which would correspond to pixel L2 as described in the preferred embodiment). Each pixel in row 3 second stage, rows 2 and 4 may then be processed based on the pixels coded in rows 1 and 3. From the two alternative first patterns set forth above, it is noted that the algorithm of the present invention is generally applicable where a first stage codes pixels in rows containing first pattern (previously coded) pixels and a second stage codes pixels in all rows which do not contain first pattern pixels.

Alternatively, once pixels in rows 1 and 5 have all been coded, pixels in missing rows 2, 3, and 4 can be coded. This permits the first stage and second stage to be interleaved, which requires less buffering.

It is further noted that reference to a pixel "above", "below", "to the left", or "to the right" is not limited to immediately adjacent pixels. For example, a pixel "above" pixel i2 may be vertically above pixel i2 with zero, one or more pixels therebetween.

Furthermore, the described embodiment discloses the scanning of lines top-to-bottom, each line being scanned from left-to-right. The invention contemplates other scan patterns, for example, scanning lines from bottom-to-top or scanning pixels in a line from right-to-left. The present invention may be applied to such alternative scanning patterns in substantially the same way to achieve substantially the same results.

In this regard, it is observed that pixel-position notation is for convenience of identification and is not intended as a limitation. For example, in the described embodiment having top-to-bottom, left-to-right scan, the GRAD1 value is determined from a pixel "above" the subject pixel. In an alternative embodiment that features the scanning of lines from "bottom-to-top", the GRAD1 value would depend on a pixel "below" the subject pixel. In the latter case, the pixel "below" is treated the same as the prxel "above" in the former scanning scheme. The two embodiments may be viewed as equivalents or the latter may be viewed as a top-to-bottom scan with the image re-oriented. Similarly, pixels may be scanned in either direction vertically or either direction horizontally depending on whether the rows are disposed vertically or horizontally.

Such varying scan patterns and pixel-position references are viewed as equivalents.

It is finally observed that "graylevel" has been illustrated in this application in the context of monochrome data (i.e., luminance). However, "graylevel" coding herein is intended to include the coding of color components as well. One embodiment relating to color would be to apply the graylevel compression/decompression apparatus or method to each of the chrominance components separately.

We claim:

1. For a graylevel image formed of (i) a first matrix pattern which includes some pixels in at least some rows in the image and (ii) a second matrix pattern which includes the remaining pixels, wherein each pixel in the first pattern has a known value associated therewith, and wherein each pixel in the second pattern is uncoded, apparatus for generating a Markov state input for entropy coding of difference values of second pattern pixels, where each difference value has an arithmetic sign associated therewith, wherein the difference value of a second pattern pixel is based on the difference between a graylevel value and a predicted value of said second pattern pixel, and wherein the second pattern pixels become known after entropy coding using said Markov state, the apparatus comprising:

means for generating a gradient Markov state value for an uncoded pixel in a row containing at least two first pattern pixels, the gradient state value being determined based on known values of at least one pixel on each side of said uncoded pixel; and means for determining a sign Markov state value for said subject uncoded pixel, based on the arithmetic sign of a difference value corresponding to at least one second pattern pixel previously entropy coded;

the Markov state input of the subject uncoded pixel being derived from the gradient Markov state value and the sign Markov state value thereof.

2. Apparatus as in claim 1 further comprising:

means for re-constructing a graylevel value for said subject uncoded pixel after entropy coding.

3. Apparatus as in claim 2 wherein said re-constructing means includes:

means for computing an interpolated value of said subject uncoded pixel after coding, said interpolated value being based on known values of at least two pixels between said subject uncoded pixel is positioned, wherein the known values of the at least two pixels are either (i) values corresponding to first pattern pixels or (ii) previously coded and re-constructed second pattern pixel values; and means for adding the interpolated value and the difference value for said subject uncoded pixel.

4. For graylevel image formed of (i) a first matrix pattern which includes rows of previously coded pixels, each having a known graylevel value associated therewith and (ii) a second matrix pattern of uncoded pixels in the remaining rows, apparatus for generating a Markov state input for entropy coding of difference values of second pattern pixels, where each difference value has an arithmetic sign associated therewith, wherein difference value of a second pattern pixel is based on the difference between a graylevel value and a predicted value of said second pattern pixel, the apparatus comprising:

means for generating a gradient Markov state value for a subject uncoded pixel in a second pattern row, the gradient state value being determined based on known values of at least one pixel above and one pixel below the subject uncoded pixel;

means for determining a sign Markov state value for the subject uncoded pixel, based on the arithmetic sign of the difference value corresponding to at least one second pattern pixel previously coded;

the Markov state input of the subject uncoded pixel being derived from the gradient Markov state value and the sign Markov state value thereof.

5. Apparatus as in claim 4 further comprising:
means for re-constructing a graylevel value for said subject uncoded pixel after entropy coding.

6. Apparatus as in claim 5 wherein said re-constructing means includes:
means for computing an interpolated value of said subject uncoded pixel after coding, said interpolated value being based on known values of at least one pixel above and one pixel below said subject uncoded pixel, wherein the known values are either (i) values corresponding to first pattern pixels or (ii) previously re-constructed values; and means for adding the interpolated value and the difference value of said subject uncoded pixel.

7. For graylevel image formed of (i) a first matrix pattern which includes all pixels at the intersections of alternating rows and alternating columns of pixels in the image and (ii) a second matrix pattern which includes the remaining pixels, wherein each pixel in the first stage matrix pattern has a value associated therewith, apparatus for generating, for each pixel in the second matrix pattern, a Markov state input for entropy coding said pixels, the apparatus comprising:

first stage means for generating a Markov state input value having an arithmetic sign component and a re-constructed value for one uncoded pixel after another along a row containing first pattern pixels; and second stage means for generating a Markov state input value for one uncoded pixel after another along a row containing no first pattern pixels;

wherein said first stage means generates a respective state input and a respective re-constructed value for a pixel along a row containing first pattern pixels based selectively on (i) the arithmetic sign component for the state input of at least one corresponding pixel previously generated by said first stage means and (ii) values corresponding to pixels in the first pattern; and wherein said second stage means generates a respective Markov state input and a respective re-constructed value for a pixel along a row containing no first matrix pattern pixels based selectively on (i) values corresponding to pixels in the first matrix pattern; (ii) re-constructed values corresponding to pixels previously generated by said first stage means; and (iii) the arithmetic sign of at least one corresponding pixel previously generated by said second stage means.

8. Apparatus as in claim 7 wherein said first stage means comprises:
means for selecting, for a pixel i1 in a row containing first pattern pixels, one sign history value from a plurality of predefined arithmetic sign values, the selected sign history being based on the arithmetic sign of a value for at least one previously coded pixel which is positioned in a previous row of pixels;

means for computing a horizontal gradient value for i1 based on the difference in value between pixel on either side of and along the row of pixel i1; and model means for combining the selected sign history value and the horizontal gradient value to form the state input for pixel i1.

9. Apparatus as in claim 8 wherein said second stage means comprises: means for selecting, for a pixel i2 in a row containing no first pattern pixels, one sign history value from a plurality of predefined arithmetic sign values, the selected sign history being based on the arithmetic sign of a difference value for at least one previously coded pixel which is positioned in the row containing i2; means for computing a vertical gradient value for i2 based on the difference in value between pixels vertically above and vertically below pixel i2; and model means for combining the selected sign history value and the vertical gradient value to form the state input for pixel i2.

10. Apparatus as in claim 9 wherein said means for selecting the i1 sign history value includes: means for selecting a value corresponding to a zero, −, or + arithmetic sign of the difference value for the pixel vertically above pixel i1 and at least one pixel away from pixel i1.

11. Apparatus as in claim 10 wherein said means for selecting the i2 sign history value includes:
means for selecting a value corresponding to a zero, −, or + arithmetic sign of the difference value for the pixel coded immediately before and in the row of pixel i2.

12. For a graylevel image formed of (i) a first matrix pattern which includes all pixels at the intersections of alternating rows and alternating columns of pixels in the image and (ii) a second matrix pattern which includes the remaining pixels, wherein each pixel in the first pattern has a value which has been previously coded, apparatus for compressing and decompressing data in the second pattern comprising:

means for compressing image data including:
means for entropy encoding a digital decision input based on a state input which defines a context for the digital decision input;

first means for predicting a value I1′ for a previously uncoded pixel i1 in a row containing first pattern pixels, where i1 has an input value x1, wherein $I1' = (L1 + R1)/2$ where L1 and R1 are values for previously coded pixels which are, respectively, to the left and right of pixel i1;

first subtractor means for computing a difference value between the input value x1 for pixel i1 and the predicted value I1′ for pixel i1;

first quantizer means for quantizing the difference value, the quantized value corresponding to a decision input to said entropy encoder means;

first means for generating a sign history value for pixel i1 as the arithmetic sign of the quantized difference value previously determined for the pixel vertically above and one pixel away from pixel i1;

first means for generating a horizontal gradient value for pixel i1 as the difference between re-constructed values of a pixel to the left and a pixel to the right of pixel i1;

first means for combining the horizontal gradient value and the sign history value to provide a state input to said entropy encoding means for pixel i1; and means for decompressing the compressed data.

13. Apparatus as in claim 12 further comprising:

second means for predicting a value I2' for a previously uncoded pixel i2 in a row containing no first pattern pixels where i2 has an input value of x2' wherein $I2'=(A2+B2)/2$ where A2 and B2 are previously coded pixels which are, respectively, vertically above and below pixel i2;

second subtractor means for computing a difference value between the input value x2 of pixel i2 and the predicted value I2' of pixel i2;

second quantizer means for quantizing the difference value, the quantized value corresponding to a decision input to said entropy encoder means;

second means for generating a sign history value for pixel i2 as arithmetic sign of the quantized difference value previously determined for the pixel coded immediately before and in the row containing pixel i2;

second means for generating a vertical gradient value for pixel i2 as the difference between re-constructed values of a pixel vertically above and below pixel i2;

second means for combining the vertical gradient value and the sign history value to provide a state input to said entropy encoding means for pixel i2.

14. Apparatus as in claim 13 wherein said first quantizer means and said second quantizer means comprise storage means containing a single quantization table.

15. Apparatus as in claim 13 wherein said first means for generating a horizontal gradient, includes first mapping means for selecting one of four possible values for the horizontal gradient value; and wherein said second means for generating a vertical gradient includes second mapping means for selecting one of four possible values for the vertical gradient value; and wherein each sign history value corresponds to a zero, —, or + arithmetic sign;

each state input thereby being one of twelve possible states.

16. Apparatus as in claim 13 wherein said decompressing means includes:

entropy decoder means for generating output decisions which correspond to the digital decision inputs to the entropy encoding means; and decoder model means for generating state inputs as successive decisions are decoded by said entropy decoding means;

said entropy decoder means generating output decisions in response to the inputting thereto of (i) compressed data generated by the entropy encoding means and (ii) state inputs from the decoder model means.

17. In an image in which each of a first pattern of pixels at the intersections of alternating rows and alternating columns have been previously coded and have reconstructed values associated therewith, a method of processing, for subsequent entropy coding, graylevel data for uncoded pixels, the method comprising the steps of:

(a) selecting a pixel i1 positioned between two first pattern pixels having respective values of L1 and R1' pixel i1 having an input value x1

(b) predicting a value I1' as $(L1+R1)/2$;

(c) subtracting the predicted value I1' from the input value x1 of pixel i1;

(d) quantizing the $(x1-I1')$ difference with a quantizer;

(e) from at least one quantized difference for at least one corresponding pixel in a previously coded row, where each of said at least one quantized differences has an arithmetic sign associated therewith, determining a sign value SIGNDISPA for i1 from said at least one arithmetic sign (f) computing a gradient value as $G1=I1'-L1$;

(g) entering as inputs to an entropy coder (1) the quantized difference for pixel i1 and (2) a Markov state input based on SIGNDISPA and G1;

(h) repeating steps (a) through (g) for one uncoded pixel after another in a row containing first pattern pixels.

18. The method of claim 17 comprising the further steps of:

(j) selecting a pixel i2 in a row containing no first pattern pixels, where i2 has an input value of x2' wherein a pixel with a value A2 is positioned vertically above and a pixel with a value B2 is positioned vertically below pixel i2;

(k) predicting a value I2' as $(A2+B2)/2$;

(l) subtracting the predicted value I2' from the input value for x2;

(m) quanitizing the difference $(x2-I2)$ with a quantizer;

(n) from a previously quantized difference for the left adjacent pixel of i2' determining a sign value SIGNDISPL for pixel i2;

(p) computing a gradient value as $G2=I2'-A2$;

(q) entering as inputs to an entropy coder (1) the quantized difference for pixel i2 and (2) a Markov state input based on SIGNDISPL and G2; and (r) repeating steps (j) through (q) for one uncoded pixel after another in a row containing no first pattern pixels.

19. For graylevel image formed of (i) a first matrix pattern which includes some pixels in at least some rows in the image and (ii) a second matrix pattern which includes the remaining pixels, wherein each pixel in the first pattern has a predetermined value associated therewith and wherein first stage pixels are second pattern pixels in rows containing first pattern pixels and second stage pixels are second patterns pixels in rows containing no first pattern pixels;

a method of decompressing entropy encoded compressed difference value inputs where each difference value input has an arithmetic sign associated therewith, the method comprising the steps of:

generating a horizontal gradient Markov state value for a subject undecoded first stage pixel in a row containing at least two first pattern pixels, the horizontal gradient value being determined based on known values of at least one pixel on each side of the subject undecoded first stage pixel;

determining a sign Markov state value for the subject undecoded first stage pixel, based on the arithmetic sign of a difference value corresponding to at least one pixel previously decoded; and deriving a Markov state input of the subject undecoded first stage pixel from the gradient Markov state value and the sign Markov state value thereof.

20. The method of claim 19 comprising the further steps of:

entropy decoding a compressed difference value input for said subject undecoded first stage pixel based on the Markov state input derived therefor;

re-constructing a graylevel value for said subject undecoded first stage pixel in a row containing first pattern pixels, including the steps of:

interpolating respective values of said undecoded first stage pixels, the interpolated value being based on known values of at least two pixels between which said subject undecoded first stage pixel is positioned, wherein the known values are either (i) values corresponding to first pattern pixels or (ii) previously re-constructed first stage values;

adding the interpolated value and the entropy decoded difference value of said first stage pixel; and for each pixel in a row of undecoded second stage pixels positioned between two rows in which every pixel has a graylevel value associated therewith:

generating a vertical gradient Markov state value for a subject undecoded second stage pixel in a second pattern row, the vertical gradient value being determined based on known values of at least one pixel above and one pixel below the subject undecoded pixel;

determining a sign Markov state value for the subject undecoded second stage pixel, based on the arithmetic sign of the difference value corresponding to at least one pixel previously decoded;

the Markov state input of the subject undecoded second stage pixel being derived from the gradient Markov state value and the sign Markov state value thereof; and entropy decoding a compressed difference value input for an undecoded second stage pixel based on the Markov state input derived therefor.

21. The method of claim 20 comprising the further step of:

re-constructing a graylevel value for said undecoded second stage pixel, including the steps of: interpolating the value of said undecoded second stage pixel, the interpolated value being based on known values of at least one pixel above and one pixel below said undecoded pixel wherein the known values are either (i) values corresponding to first pattern pixels or (ii) previously re-constructed values; and adding the interpolated value and the entropy decoded difference value of said second stage pixel.

22. A method of processing graylevel data for uncoded pixels in an image wherein the pixels in a first pattern of pixels in the image have all been previously coded and are positioned in a grid of rows and columns, wherein the remaining pixels are uncoded and the number of uncoded pixels between two consecutive columns in the grid and the number of uncoded pixels between two consecutive rows int he grid is $(2^k-1)$ where k is a fixed value integer greater than 1, the method comprising the steps of:

(a) determining a Markov state input value for each uncoded pixel positioned half-way between two previously coded horizontally spaced pixels in said grid pattern and entropy coding said each uncoded pixel based on the state input value derived from a gradient Markov state value and a sign Markov state value determined therefor;

(b) determining a Markov state input value for each uncoded pixel positioned half-way between two previously coded vertically spaced pixels in said grid pattern and entropy coding said each uncoded pixel based on the state input value derived from a gradient Markov state value and a sign Markov state value determined therefor; and (c) recursively repeating steps (a) and (b) on the remaining uncoded pixels in the image until all of said uncoded pixels in the image have been entropy coded.

* * * * *